United States Patent
Kusama et al.

(10) Patent No.: US 9,519,086 B2
(45) Date of Patent: Dec. 13, 2016

(54) ANISOTROPIC LIGHT DIFFUSION FILM

(71) Applicant: LINTEC Corporation, Itabashi-ku, Tokyo (JP)

(72) Inventors: Kentaro Kusama, Tokyo (JP); Tomoo Orui, Tokyo (JP); Kenta Tomioka, Tokyo (JP); Satoru Shoshi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 76 days.

(21) Appl. No.: 14/372,269

(22) PCT Filed: Dec. 20, 2012

(86) PCT No.: PCT/JP2012/083008
§ 371 (c)(1),
(2) Date: Jul. 15, 2014

(87) PCT Pub. No.: WO2013/108540
PCT Pub. Date: Jul. 25, 2013

(65) Prior Publication Data
US 2014/0340753 A1    Nov. 20, 2014

(30) Foreign Application Priority Data

Jan. 19, 2012 (JP) .................................. 2012-008984

(51) Int. Cl.
*G02B 5/02* (2006.01)
*G02B 26/02* (2006.01)
(Continued)

(52) U.S. Cl.
CPC .............. *G02B 5/0257* (2013.01); *G02B 5/021* (2013.01); *G02B 5/0236* (2013.01);
(Continued)

(58) Field of Classification Search
USPC ........ 359/599, 601, 609, 613; 428/156, 167, 428/169, 172
See application file for complete search history.

(56) References Cited

U.S. PATENT DOCUMENTS

| 6,398,370 B1 * | 6/2002 | Chiu | G02B 5/003 |
| | | | 359/601 |
| 7,072,096 B2 * | 7/2006 | Holman | F21S 8/08 |
| | | | 257/E25.02 |

(Continued)

FOREIGN PATENT DOCUMENTS

| EP | 0272582 A2 | 6/1988 |
| EP | 0762154 A2 | 3/1997 |

(Continued)

*Primary Examiner* — Bumsuk Won
*Assistant Examiner* — Balram Parbadia
(74) *Attorney, Agent, or Firm* — Fitch, Even, Tabin & Flannery LLP

(57) ABSTRACT

An anisotropic light diffusion film includes increased uniformity of the intensity of diffused light in the light diffusion angle region, and the light diffusion angle region has been effectively expanded. An anisotropic light diffusion film includes a first louver structure region and a second louver structure region, in which plural plate-shaped regions having different refractive indices are alternately arranged in parallel along any one direction along the film plane, sequentially from the lower side along the film thickness direction, and the anisotropic light diffusion film includes an overlapping louver structure region in which the upper end of the first louver structure region and the lower end of the second louver structure region overlap each other.

11 Claims, 25 Drawing Sheets

(51) Int. Cl.
 *G02B 1/04* (2006.01)
 *G02F 1/1335* (2006.01)
(52) U.S. Cl.
 CPC .............. *G02B 26/023* (2013.01); *G02B 1/04* (2013.01); *G02F 1/133504* (2013.01)

(56) References Cited

U.S. PATENT DOCUMENTS

| | | | | |
|---|---|---|---|---|
| 2003/0048400 | A1* | 3/2003 | Kim | G02F 1/133504 349/117 |
| 2007/0046870 | A1* | 3/2007 | Murakami | G02F 1/133528 349/117 |
| 2008/0130121 | A1* | 6/2008 | Kim | H01J 1/74 359/601 |
| 2008/0137222 | A1* | 6/2008 | Park | B29D 11/00634 359/885 |
| 2008/0248250 | A1* | 10/2008 | Flemming | C03C 3/095 428/156 |
| 2010/0033827 | A1* | 2/2010 | Foley | G02B 5/045 359/614 |
| 2011/0080538 | A1* | 4/2011 | Shiota | G03F 7/0007 349/61 |
| 2012/0051032 | A1* | 3/2012 | Aoyama | G02B 5/00 362/97.2 |

FOREIGN PATENT DOCUMENTS

| | | |
|---|---|---|
| JP | 63-309902 A | 12/1988 |
| JP | 64-40905 A | 2/1989 |
| JP | 9-127331 A | 5/1997 |
| JP | 2003-90905 A | 3/2003 |
| JP | 3480260 B | 10/2003 |
| JP | 2005-37802 A | 2/2005 |
| JP | 2005-316354 A | 11/2005 |
| JP | 2005-326824 A | 11/2005 |
| JP | 2006-119241 A | 5/2006 |
| JP | 3829601 B2 | 7/2006 |
| JP | 2006-323379 A | 11/2006 |
| JP | 2006-350290 A | 12/2006 |
| JP | 2008-239757 A | 10/2008 |
| JP | 2011-191780 A | 9/2011 |

* cited by examiner

Fig.18(a)
Fig.18(b)
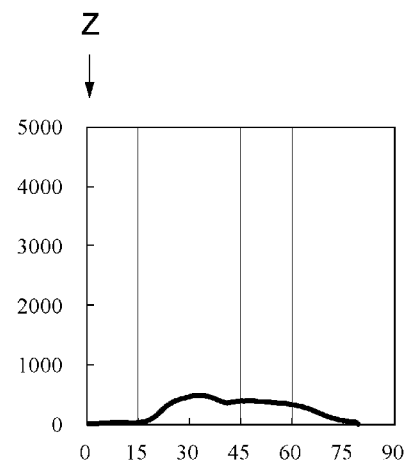
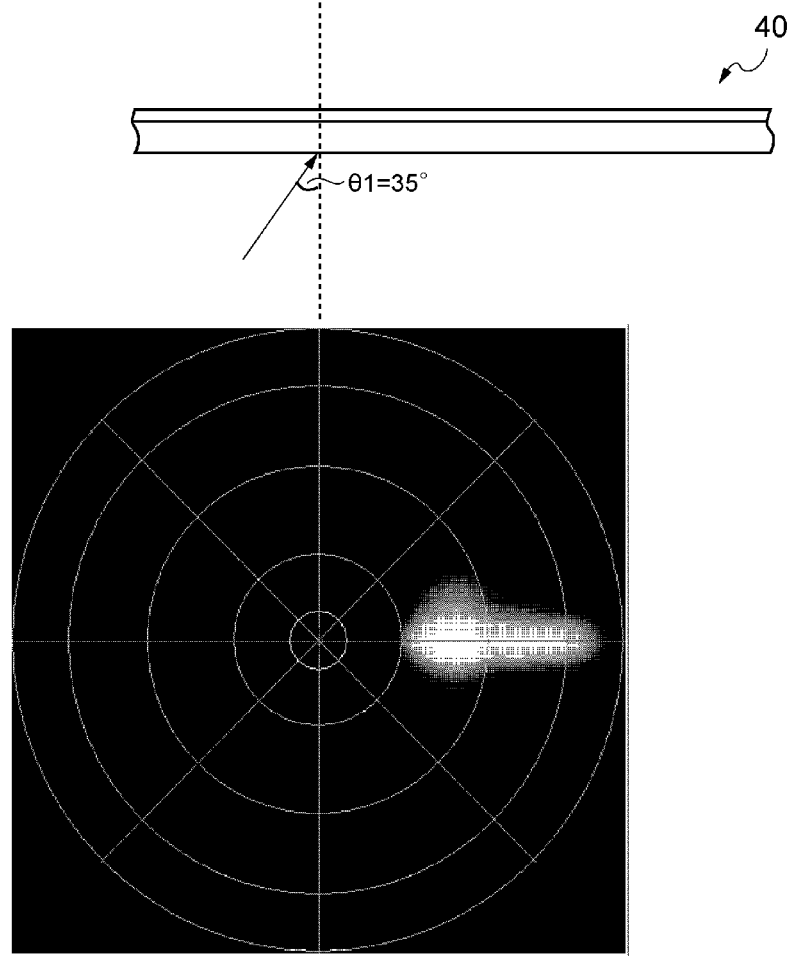

ANISOTROPIC LIGHT DIFFUSION FILM

TECHNICAL FIELD

The present invention relates to an anisotropic light diffusion film.

More particularly, the present invention relates to an anisotropic light diffusion film in which uniformity of the intensity of diffused light in the light diffusion angle region has been increased, and the light diffusion angle region has been effectively expanded.

BACKGROUND ART

In conventional liquid crystal display devices, a predetermined image can be recognized by utilizing light emitted from a light source provided inside the device (internal light source).

However, with the popularization of mobile telephones, on-board televisions for vehicles, and the like in recent years, there are increasing opportunities of viewing liquid crystal display screens outdoors, and along therewith, there is also a problem that the light intensity from an internal light source is lower than that of outdoor light, and a predetermined screen is made not easily visible.

Furthermore, in mobile applications such as mobile telephones, since the electric power consumption by an internal light source of a liquid crystal display device occupies a large proportion of the total electric power consumption, when the internal light source is used heavily, there is a problem that the duration time of the battery is shortened.

Thus, in order to address these problems, reflective liquid crystal display devices that utilize external light as a light source have been developed.

With such a reflective liquid crystal display device, since external light is utilized as a light source, images can be recognized more clearly when the external light is more intense, and the electric power consumption of an internal light source can also be effectively suppressed.

That is, in regard to such a reflective liquid crystal display device, it has been suggested to incorporate an anisotropic light diffusion film intended for efficient light diffusion so that external light can be efficiently transmitted to be introduced into the interior of a liquid crystal display device, and the external light can be effectively utilized (for example, Patent Document 1).

To explain more specifically, Patent Document 1 discloses a liquid crystal device (1112) which includes, as illustrated in FIG. 26(*a*) to FIG. 26(*b*), a liquid crystal cell including an upper substrate 1103, a lower substrate 1107, and a liquid crystal layer 1105 interposed therebetween; a light reflecting plate 1110 provided on the side of the lower substrate 1107; and a light control plate (anisotropic light diffusion film) 1108 provided between the liquid crystal layer 1105 and the light reflecting plate 1110.

Further, a light control plate 1108 for selectively scattering light that is incident at a predetermined angle and also for transmitting light that is incident at angles other than the predetermined light, is provided, and such a light control plate 1108 is disposed in the liquid crystal cell such that the scattering axis direction 1121, which corresponds to the direction of selectively scattering the light incident at a predetermined angle, being projected on the surface of the light control plate 1108, is arranged to be almost in the direction of six o'clock in the liquid crystal cell plane.

Furthermore, regarding the anisotropic light diffusion film that is used in a reflective liquid crystal display device, various forms are known. However, particularly, an anisotropic light diffusion film having, within the film, a louver structure that can control the light direction or regulate light dispersibility by having long and thin plate-shaped high refractive index regions and long and thin plate-shaped low refractive index regions arranged alternately in parallel along any one direction along the film plane, is widely used (for example, Patent Documents 2 to 4).

That is, Patent Document 2 discloses a light control film (anisotropic light diffusion film) which is obtained by irradiating a film-like composition containing plural kinds of compounds having polymerizable carbon-carbon double bonds, with ultraviolet radiation from a particular direction, and curing the composition, and is capable of selectively scattering only light incident at an angle in a particular range, characterized in that at least one compound included in the composition is a compound having plural aromatic rings and one polymerizable carbon-carbon double bond in the molecule.

Furthermore, Patent Document 3 discloses a photocurable composition characterized by containing (A) a fluorene-based compound having a polymerizable carbon-carbon double bond in the molecule; (B) a cation polymerizable compound having a refractive index that is different from that of the fluorene-based compound (A); and (C) a photo-cation polymerization initiator, and a light control film formed by curing the photocurable composition.

Furthermore, Patent Document 4 discloses a composition for anisotropic light diffusion film including at least (A) a bisphenol A type epoxy resin or brominated bisphenol A type epoxy resin represented by Formula (5); (B) a radical-polymerizable compound having at least one or more ethylenically unsaturated bonds in the structural unit; (D) a photopolymerization initiator generating a radical species by chemical radiation; and (E) a thermal polymerization initiator generating a cation species by heat, and an anisotropic light diffusion film produced using the composition. More specifically, a composition for anisotropic light diffusion film characterized in that at normal temperature, the refractive index of the (B) radical polymerizable compound is lower than the refractive indices of the (A) bisphenol A type epoxy resin or brominated bisphenol A type epoxy resin, and the (C) compound having at least one cationic polymerizable group in the molecule, and an anisotropic light diffusion film produced using the composition.

[Chemical Formula 1]

(5)

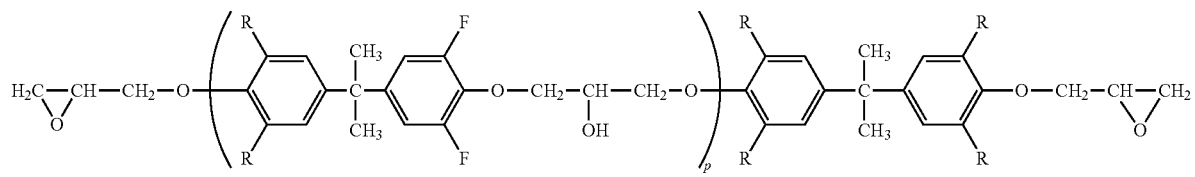

wherein in formula (5), R represents a hydrogen atom or a bromine atom; and the number of repetitions p represents a natural number.

Furthermore, there has been disclosed a method of laminating anisotropic light diffusion films so that the width of the light diffusion incident angle region can be further expanded (for example Patent Document 5).

That is, Patent Document 5 discloses a screen for projection characterized by being formed by laminating plural sheets of light control films (hereinafter, anisotropic light diffusion films), in each of which the fog value is angle-dependent, and when light enters at an angle of 0° to 180° with respect to the surface, the light scattering angle range that exhibits a fog value of 60% or higher is 30° or more.

Furthermore, as another method of expanding the width of the light diffusion incident angle region, there has also been disclosed a method of further applying a composition for anisotropic light diffusion film on an anisotropic light diffusion film that has been prepared in advance, and then photocuring the composition so as to form two louver structures in the film (for example, Patent Document 6).

That is, Patent Document 6 discloses a method for producing a light control plate (anisotropic light diffusion film), the method including a first step of retaining on a film a resin composition composed of plural compounds, each having one or more polymerizable carbon-carbon double bonds in the molecule and having a refractive index that is different from the refractive indices of the other compounds, irradiating the composition with ultraviolet radiation from a particular direction, and thereby curing the resin composition; and a second Step of retaining (applying) the resin composition on the film of the cured product thus obtained, irradiating the resin composition with ultraviolet radiation from a direction different from that of the first step, and thereby curing the resin composition, characterized in that the second step is repeated as necessary.

CITATION LIST

Patent Document

Patent Document 1: Japanese Patent No. 3480260 (Claims)
Patent Document 2: JP 2006-350290 A (Claims)
Patent Document 3: JP 2008-239757 A (Claims)
Patent Document 4: Japanese Patent No. 3829601 (Claims)
Patent Document 5: JP 2005-316354 A (Claims)
Patent Document 6: JP 63-309902 A (Claims)

DISCLOSURE OF TEE INVENTION

Problem to be Solved by the Invention

However, since the anisotropic light diffusion films disclosed in Patent Documents 1 to 4 narrow light diffusion angle region for light diffusion, it has been difficult to utilize external light efficiently in a reflective liquid crystal display device.

Furthermore, from the viewpoint of cost reduction, when the film thickness of the film is decreased, uniformity in the intensity of diffused light in the light diffusion angle region may not be maintained, and the film exhibits a very strong peak at a predetermined angle within the relevant light diffusion angle region.

This implies that at the relevant predetermined angle, incident light is not diffused, but passes through the light diffusion film.

Therefore, when such a light diffusion film is applied to a reflective liquid crystal display device, there has been a problem that spots are generated in the display screen, and visibility becomes very poor.

On the other hand, the anisotropic light diffusion film disclosed in Patent Document 5 can have the width of the light diffusion incident angle region expanded to a certain extent; however, due to the lamination of plural anisotropic light diffusion films, there has been a problem that clarity of the images is decreased, iridescent colors (moiré phenomenon) appear, or it is economically disadvantageous.

Furthermore, also for the anisotropic light diffusion film disclosed in Patent Document 6, the width of the light diffusion incident angle region can be expanded to a certain extent; however, since the anisotropic light diffusion film has a configuration in which another anisotropic light diffusion film is separately formed on each sheet of anisotropic light diffusion film, there has been a problem that not only it is economically disadvantageous, but also delamination is prone to occur.

In addition to that, in the anisotropic light diffusion film disclosed in Patent Documents 5 and 6, at the interface between two louver structure regions present in the film, there exist spacing areas where louver structure are not formed. Therefore, it is disadvantageous from the viewpoint of reducing the total film thickness, and there is also a problem that unexpected scattered light is generated at the spacing areas, and thereby anisotropy in light diffusion is prone to be decreased.

Thus, in view of such circumstances as described above, the inventors of the present invention conducted a thorough study, and they found that when a first louver structure region and a second louver structure region are formed in a same film, and also, an overlapping louver structure region in which these louver structure regions are made to partly overlap each other is provided, an anisotropic light diffusion film that solves the problems described above is obtained. Thus, the inventors completed the present invention.

That is, an object of the present invention is to provide an anisotropic light diffusion film in which uniformity of the intensity of diffused light in a light diffusion angle region has been increased, and the light diffusion angle region has been effectively expanded.

Meanwhile, the term "satisfactory incident angle dependency" means that the distinction between an incident angle region in a film, in which light diffusion of incident light occurs (light diffusion incident angle region), and another incident angle region in which light diffusion does not occur, is controlled definitely. The details of such a light diffusion incident angle region will be described below.

Means for Solving Problem

According to the present invention, there is provided an anisotropic light diffusion film having a first louver structure region and a second louver structure region in which plural plate-shaped regions having different refractive indices are alternately arranged in parallel along any one direction along the film plane, sequentially from the lower side along the film thickness direction, characterized by having an overlapping louver structure region in which the upper end of the first louver structure region and the lower end of the second louver structure region overlap each other. Thus, the problems described above can be solved.

That is, an anisotropic light diffusion film according to the present invention has a first louver structure region and a second louver structure region.

Therefore, by varying the inclination angles of the plate-shaped regions included in the respective louver structure regions, uniformity of the intensity of diffused light in the light diffusion angle region can be enhanced.

On the other hand, when the inclination angles of the plate-shaped regions included in the respective louver structure regions are caused to overlap, although the contribution to an expansion of the light diffusion angle region is small, the lengths of the louvers in total in the film thickness direction are stably extended. Therefore, uniformity of the intensity of diffused light in the light diffusion angle region can be enhanced.

Furthermore, since the anisotropic light diffusion film of the present invention has an overlapping louver structure region in which the upper end of the first louver structure region and the lower end of the second structure region overlap each other, the generation of scattered light in a louver structure-unformed area between the respective louver structure regions can be suppressed, and anisotropy in light diffusion can be stably maintained.

Meanwhile, according to the present invention, the "light diffusion incident angle region" means, in relation to an anisotropic light diffusion film, the range of angles of incident light corresponding to the emission of diffused light in a case in which the angle of incident light from a point light source is changed.

On the other hand, according to the present invention, the "light diffusion angle region" means, in relation to an anisotropic light diffusion film, the range of angles of diffused light obtainable in a state in which a point light source is fixed at an angle at which incident light is diffused to the largest extent.

Here, in regard to the anisotropic light diffusion film related to the present invention, in view of characteristics, the width of the light diffusion angle region (hereinafter, may be referred to as "angle of aperture of diffused light") and the width of the light diffusion incident angle region are approximately the same.

Furthermore, on the occasion of configuring the anisotropic light diffusion film of the present invention, it is preferable that the overlapping louver structure region is formed such that the tips of any one side of the plate-shaped regions respectively originating from the first louver structure region and the second louver structure region are in contact with the vicinity of the tips of the plate-shaped regions originating from the other louver structure region.

When such a configuration is employed, louver structures can be disposed efficiently within a limited film thickness, uniformity of the intensity of diffused light in the light diffusion angle region is enhanced, and also, the light diffusion angle region can be expanded more effectively.

Furthermore, on the occasion of configuring the anisotropic light diffusion film of the present invention, it is preferable to adjust the thickness of the overlapping louver structure region to a value in the range of 1 μm to 40 μm.

When such a configuration is employed, the generation of scattered light at the overlap section of the first louver structure region and the second louver structure region in the overlapping louver structure region can be suppressed, and uniformity of the intensity of diffused light in the light diffusion angle region can be maintained more stably.

Also, on the occasion of configuring the anisotropic light diffusion film of the present invention, it is preferable to adjust the thickness of the overlapping louver structure region to a value in the range of 0.1% to 10% relative to the film thickness (100%).

When such a configuration is employed, since the overlapping state of the first louver structure region and the second louver structure region in the overlapping louver structure region can be adjusted to a more suitable extent, the generation of scattered light at the overlap section of the respective louver structure regions can be suppressed, and uniformity of the intensity of diffused light in the light diffusion angle region can be maintained more stably.

Furthermore, on the occasion of configuring the anisotropic light diffusion film of the present invention, it is preferable to adjust the absolute value of the difference of the inclination angles of the plate-shaped regions having different refractive indices, respectively originating from the first louver structure region and the second louver structure region in the overlapping louver structure region, to a value of 1° or more.

When such a configuration is employed, the light diffusion angle region can be expanded more effectively.

Furthermore, on the occasion of configuring the anisotropic light diffusion film of the present invention, it is preferable to adjust the absolute value of the inclination of the plate-shaped regions originating from the second louver structure region in the overlapping louver structure region, to a value larger than the absolute value of the inclination angle of the plate-shaped regions originating from the first louver structure region.

When such a configuration is employed, in the second louver structure region that is relatively more difficult to form as compared with the first louver structure region, plate-shaped regions having a sufficient length along the film thickness direction can be obtained, uniformity of the intensity of diffused light in the light diffusion angle region can be enhanced, and also, the light diffusion angle region can be expanded more effectively.

Furthermore, on the occasion of configuring the anisotropic light diffusion film of the present invention, it is preferable to adjust the widths of the plate-shaped regions in the first louver structure region and the second louver structure region, respectively to values in the range of 0.1 μm to 15 μm.

When such a configuration is employed, incident light can be reflected more stably in the first louver structure region and the second louver structure region, and uniformity of the intensity of diffused light in the light diffusion angle region originating from the first louver structure and the second louver structure region can be enhanced more effectively.

Furthermore, on the occasion of configuring the anisotropic light diffusion film of the present invention, it is preferable that the plate-shaped regions in the first louver structure region are bent in the upper part or in the lower part along the film thickness direction.

When such a configuration is employed, the balance between reflection and transmission in the first louver structure region is made complicated, and the angle of aperture of diffused light can be expanded effectively.

Furthermore, on the occasion of configuring the anisotropic light diffusion film of the present invention, it is preferable that among the plate-shaped regions in the first louver structure region and the second louver structure region, the main component of the plate-shaped regions having a higher refractive index is a (meth)acrylic acid ester polymer containing plural aromatic rings, and the main component of the plate-shaped regions having a lower refractive index is a urethane (meth)acrylate polymer.

When such a configuration is employed, the first louver structure region, the second louver structure region, and the overlapping louver structure region can be formed efficiently.

Furthermore, on the occasion of configuring the anisotropic light diffusion film of the present invention, it is preferable to adjust the thickness of the first louver structure region to a value in the range of 50 μm to 500 μm, and to adjust the thickness of the second louver structure region to a value in the range of 10 μm to 200 μm.

When such a configuration is employed, uniformity of the intensity of diffused light in the light diffusion angle region can be enhanced more effectively.

Furthermore, on the occasion of configuring the anisotropic light diffusion film of the present invention, it is preferable to adjust the value of subtracting the thickness of the overlapping louver structure region from the sum of the thicknesses of the first louver structure region and the second louver structure region, to a value of 80% or more relative to the film thickness (100%).

When such a configuration is employed, uniformity of the intensity of diffused light in the light diffusion angle region can be enhanced more effectively.

BRIEF DESCRIPTION OF DRAWINGS

FIGS. 18(a) and 18(b) are a spectral diagram and a photograph illustrating the light diffusion characteristics of the anisotropic light diffusion film of Comparative Example 1;

BEST MODE(S) FOR CARRYING OUT THE INVENTION

The present invention relates to an anisotropic light diffusion film having a first louver structure and a second louver structure, in which plural plate-shaped regions having different refractive indices are alternately arranged in parallel along any one direction along the film plane, sequentially from the lower side along the film thickness direction, the anisotropic light diffusion film having an overlapping louver structure region in which the upper end of the first louver structure region and the lower end of the second louver structure region overlap each other.

Hereinafter, the anisotropic light diffusion film of the present invention will be described specifically with appropriate reference to the drawings.

1. Fundamental Principle of Light Diffusion in Anisotropic Light Diffusion Film

First, the fundamental principle of light diffusion in an anisotropic light diffusion film will be explained using FIG. 1 and FIG. 2.

Figure 2A:
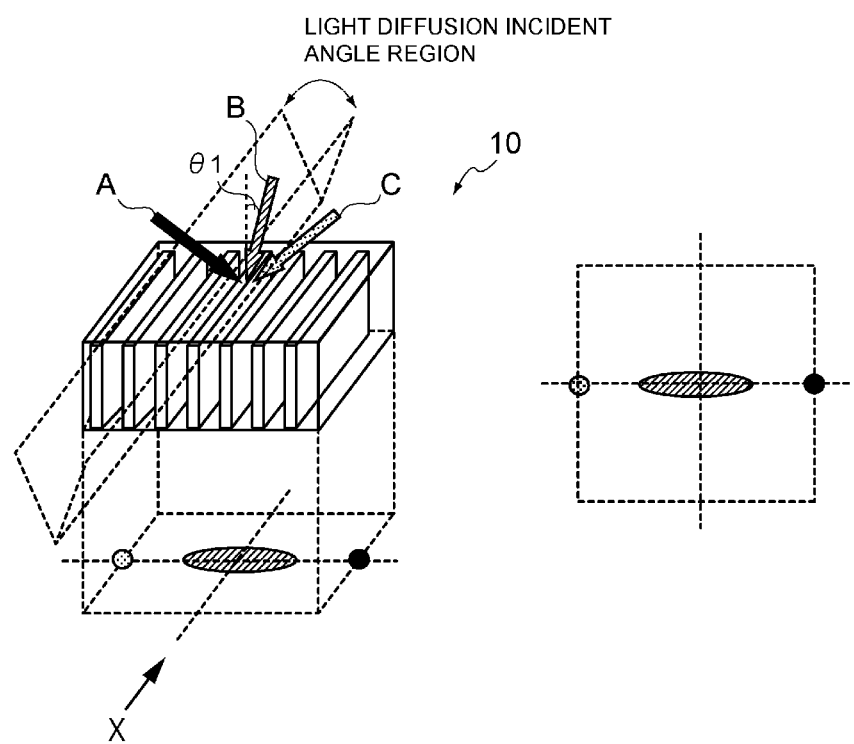
FIGS. 2(a) and 2(b) are diagrams provided to illustrate the incident angle dependency, anisotropy, and the angle of aperture in an anisotropic light diffusion film.

Meanwhile, according to the present invention, the term "anisotropy" means that, as illustrated in FIG. 2(a), when light is diffused by the film, the diffusion state of light for the emitted light that has been diffused in a plane parallel to the film (shape of spread of the diffused light), has different properties depending on the direction within the same plane.

More specifically, as illustrated in FIG. 2(a), among the components included in the incident light, for those components that are perpendicular to the direction of the louver structures extended along any one direction along the film plane, diffusion of light occurs selectively; however, among the components included in the incident light, for those components that are parallel to the direction of the louver structures extended along any one direction along the film plane, diffusion of light is not likely to occur. Thus, anisotropic light diffusion is realized.

Therefore, the shape of spread of diffused light in the anisotropic light diffusion film is, as illustrated in FIG. 2(a), approximately an elliptical form.

Figure 2B:
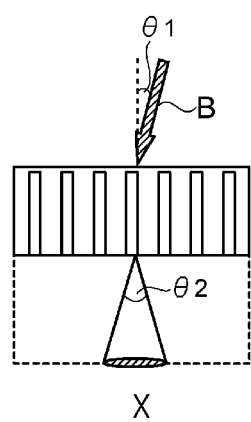

Furthermore, as described above, since the component of diffused light that contributes to anisotropic light diffusion is mainly a component that is perpendicular to the direction of the louver structures extended along any one direction along the film plane, as illustrated in FIG. 2(b), the "incident angle θ1" of incident light as used in the present invention is intended to mean the incident angle of the component that is perpendicular to the direction of the louver structures extended along any one direction along the film plane. Furthermore, at this time, the incident angle θ1 is to mean the angle (°) obtainable when the angle with respect to the normal line at the surface of the incident side of the anisotropic light diffusion film is designated as 0°.

Furthermore, the "angle of aperture of diffused light" according to the present invention is the width of the light diffusion angle region, and as illustrated in FIG. 2(b), the angle of aperture means the angle of aperture θ2 of diffused light with respect to the incident light at a predetermined incident angle θ1 in a case in which a cross-section of the film is viewed from the direction X that is parallel to the direction of the louver structures extended along any one direction along the film plane.

Figure 1A:
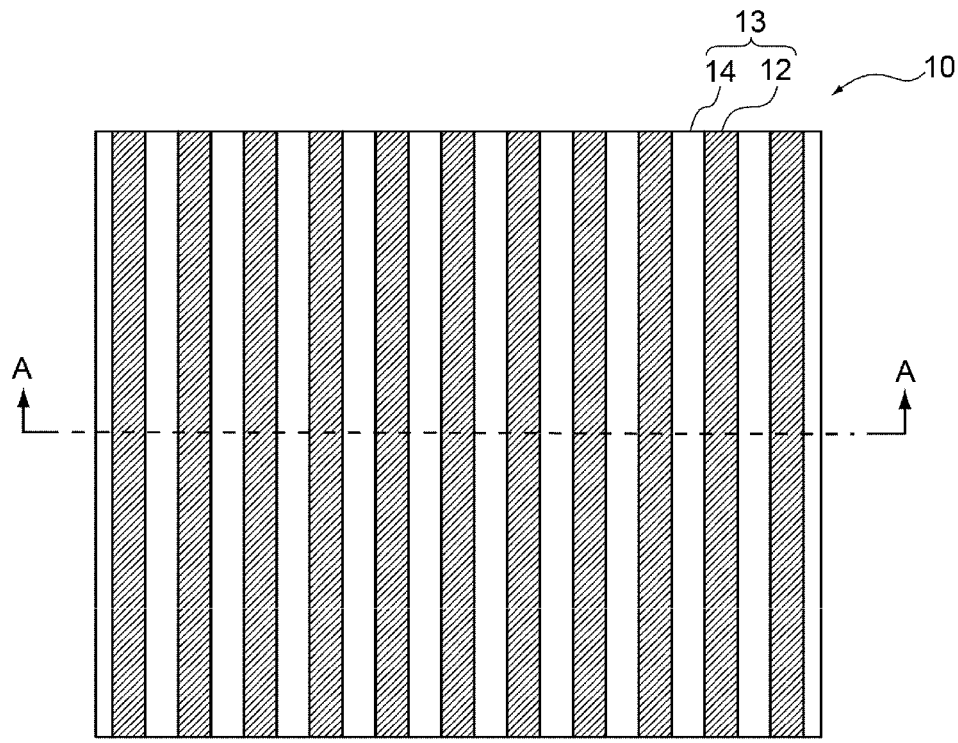
FIGS. 1(a) and 1(b) are diagrams provided to illustrate the outline of the louver structures in an anisotropic light diffusion film.
Figure 1B:
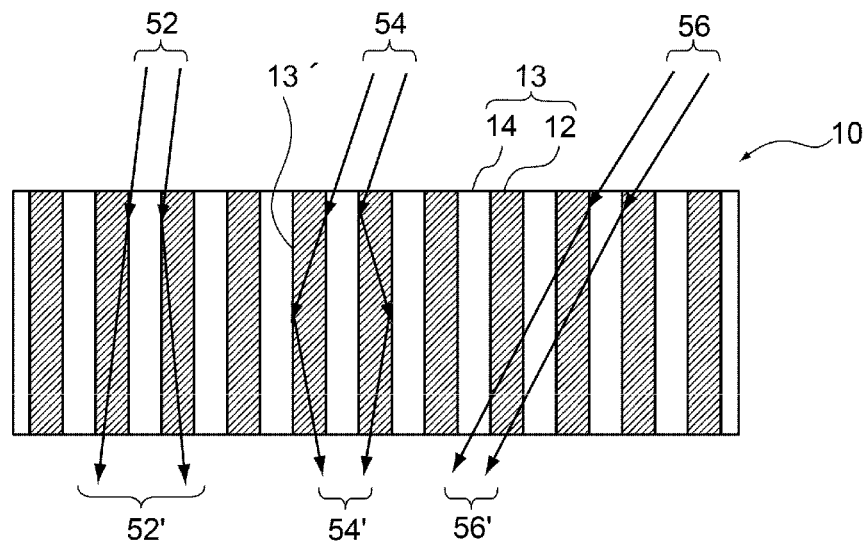

Here, FIG. 1(a) shows a top plan view (plan view) of an anisotropic light diffusion film 10 having one louver structure region in the film, and FIG. 1(b) shows a cross-sectional view of the anisotropic light diffusion film 10, which is obtainable when the anisotropic light diffusion film 10 illustrated in FIG. 1(a) is cut in the perpendicular direction along the dotted line A-A, and the cut surface is viewed from the arrow direction.

Furthermore, FIG. 2(a) shows a general view of the anisotropic light diffusion film 10, and FIG. 2(b) shows a cross-sectional view in a case in which the anisotropic light diffusion film 10 of FIG. 2(a) is viewed from the direction X.

As illustrated in such a plan view of FIG. 1(a), the anisotropic light diffusion film 10 includes, along any one direction along the film plane, a louver structure 13 in which plate-shaped regions 12 having a relatively higher refractive index and plate-shaped regions 14 having a relatively lower refractive index are alternately arranged in parallel.

Furthermore, as illustrated in the cross-sectional diagram of FIG. 1(b), the plate-shaped regions 12 having a higher refractive index and the plate-shaped regions 14 having a lower refractive index respectively having a predetermined thickness, and these regions maintain a state of being alternately arranged in parallel even in a direction perpendicular to the anisotropic light diffusion film 10.

It is speculated that as a result, as illustrated in FIG. 2(a), when the incident angle falls in the light diffusion incident angle region, incident light is diffused by the anisotropic light diffusion film 10.

That is, as illustrated in FIG. 1(b), it is speculated that when the incident angle of light incident to the anisotropic light diffusion film 10 has a value in a predetermined range of angles from parallel with respect to the boundary surface 13' of the louver structure 13, that is, a value in the light diffusion incident angle region, the incident light (52, 54) passes through the interior of the high refractive index plate-shaped regions 12 in the louver structure along the film thickness direction while changing the direction, and consequently, the direction of travel of light at the light emitting surface side is not kept constant.

As a result, it is speculated that when the incident angle is within the light diffusion incident angle region, the incident light is diffused by the anisotropic light diffusion film 10 (52', 54').

On the other hand, when the incident angle of light incident to the anisotropic light diffusion film 10 does not fall in the light diffusion incident angle region, as illustrated in FIG. 1(b), it is speculated that the incident light 56 is directly transmitted through the anisotropic light diffusion film 10 without being diffused by the anisotropic light diffusion film (56').

Based on the fundamental principle described above, the anisotropic light diffusion film 10 having the louver structure 13 can exhibit, for example, incident angle dependency in connection with transmission and diffusion of light as illustrated in FIG. 2(a).

Furthermore, as illustrated in FIG. 2(a), the anisotropic light diffusion film is such that when the incident angle of incident light is included in the light diffusion incident angle region, even if the incident angles are different, almost similar light diffusion can be induced at the light emitting surface side.

Therefore, it can be said that the anisotropic light diffusion film thus obtained also has a light collecting action of concentrating light to a predetermined site.

Meanwhile, the light diffusion incident angle region is, as illustrated in FIG. 2(a), an angle region that is determined for each anisotropic light diffusion film by the difference in the refractive index, the inclination angle or the like of the louver structures in the anisotropic light diffusion film.

Furthermore, regarding the change in the direction of incident light in the high refractive index region 12 within the louver structure, the case of the direction being of gradient index type in which the direction changes in a curve can be considered, in addition to the case of the direction being of step index type in which the direction changes zigzag in a straight line by the total reflection illustrated in FIG. 1(b).

2. Fundamental Configuration

Next, the fundamental configuration of the anisotropic light diffusion film of the present invention will be explained using the drawings.

Figure 3A:
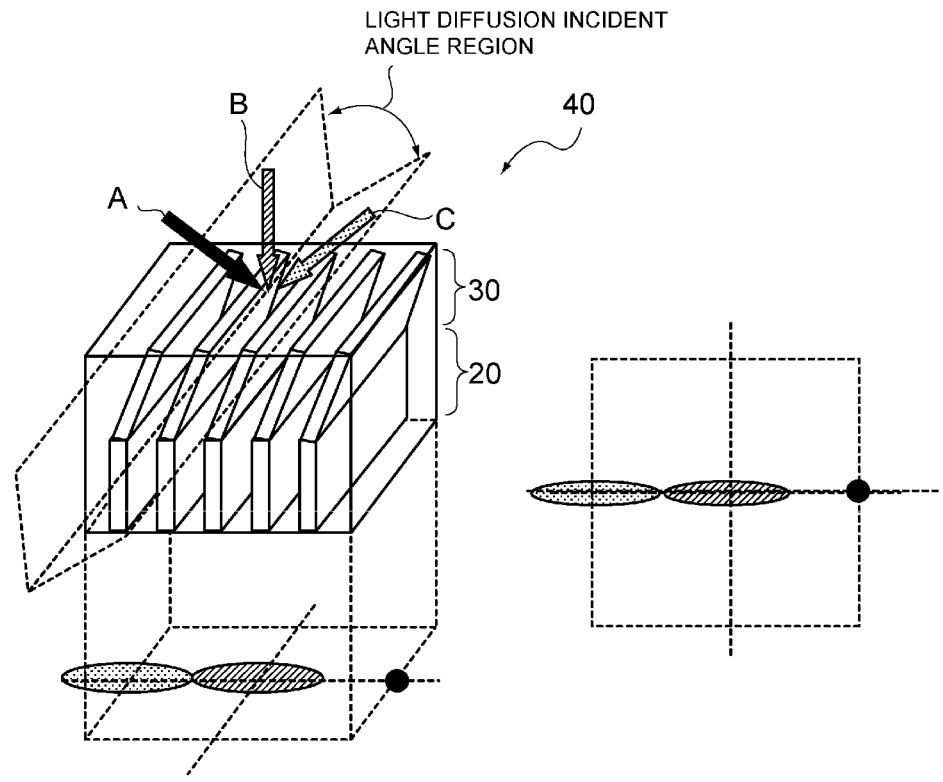
FIGS. 3(a) and 3(b) are other diagrams provided to illustrate the incident angle dependency, anisotropy, and the angle of aperture in an anisotropic light diffusion film.
Figure 3B:
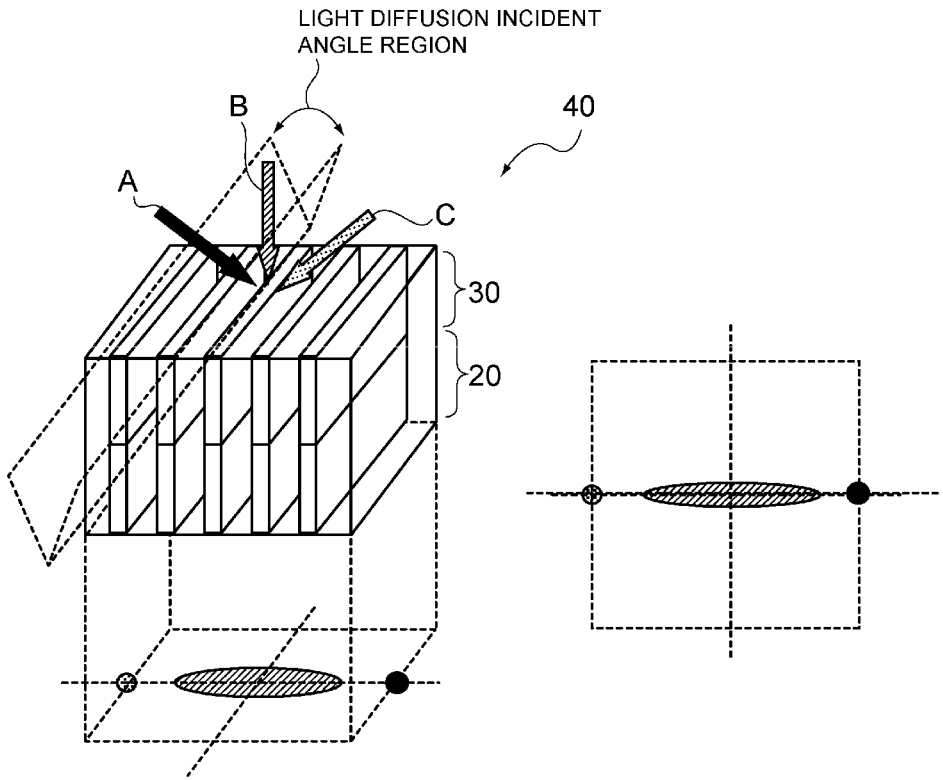

As illustrated in FIGS. 3(a) and 3(b), the anisotropic light diffusion film 40 of the present invention is characterized by having a first louver structure region 20 and a second louver structure region 30 sequentially from the lower side along the film thickness direction.

Therefore, with the anisotropic light diffusion film of the present invention is used, for example, as illustrated in FIG. 3(a), when the incident angles of the respective louver structure regions are varied, uniformity of the intensity of diffused light in the light diffusion angle region can be enhanced, and also, the light diffusion incident angle region can be expanded effectively.

On the other hand, as illustrated in FIG. 3(b), when the inclination angles of the respective louver structure regions are overlapped, although the contribution to the expansion of the light diffusion angle region is small, since the length of louvers in total in the film thickness direction is stably extended, uniformity of the intensity of diffused light in the light diffusion angle region can be enhanced effectively.

Meanwhile, the term "lower side" described above means, when a coating layer is provided on a process sheet, the side closer to the process sheet in the film thickness direction of the coating layer. Therefore, this term is a term used for the convenience of explaining the present invention, and is not intended to restrict the up and down directions of the anisotropic light diffusion film itself.

Figure 4A:
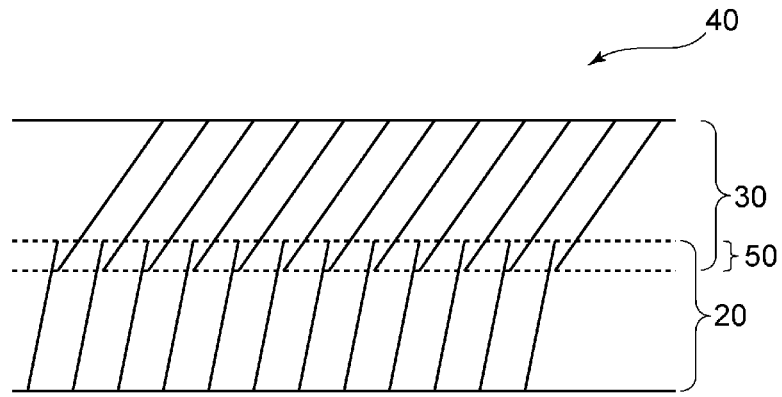
FIGS. 4(a) to 4(c) are diagrams provided to illustrate an overlapping louver structure region.

Furthermore, as illustrated in FIG. 4(a), the anisotropic light diffusion film 40 of the present invention is characterized by having an overlapping louver structure region 50 in which the upper end of a first louver structure region 20 and the lower end of a second louver structure region 30 overlap each other.

Therefore, when the anisotropic light diffusion film of the present invention is used, the generation of scattered light at a louver structure-unformed section between the respective louver structure regions is suppressed, and both the uniformity of the intensity of diffused light in the light diffusion angle region, and the size of the width of the light diffusion angle region (angle of aperture of diffused light) can be maintained stably.

Figure 4B:
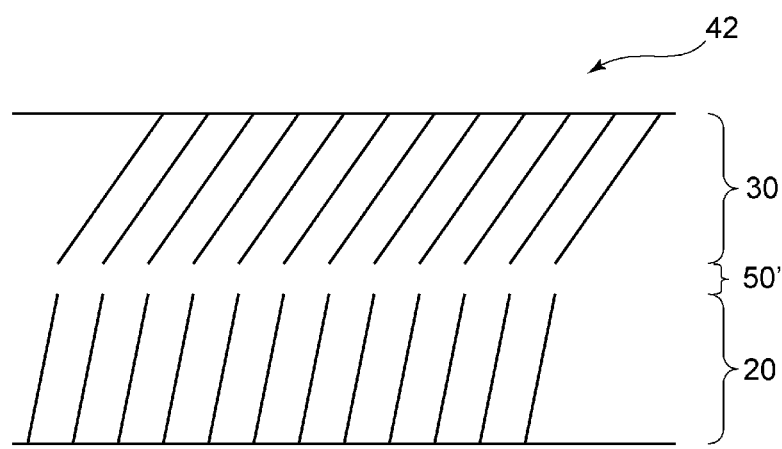

On the other hand, as illustrated in FIG. 4(b), when a louver structure-unformed section 50' is present at the interface between two louver structure regions (20, 30) present inside the film 42, uniformity of the intensity of diffused light in the light diffusion angle region is prone to decrease, or the angle of aperture of diffused light may become insufficient.

It is speculated that such a phenomenon occurs because, when the incident light that has passed through the second louver structure region hits the upper end of the first louver structure and is scattered, anisotropy in light diffusion is prone to decrease.

Figure 4C:
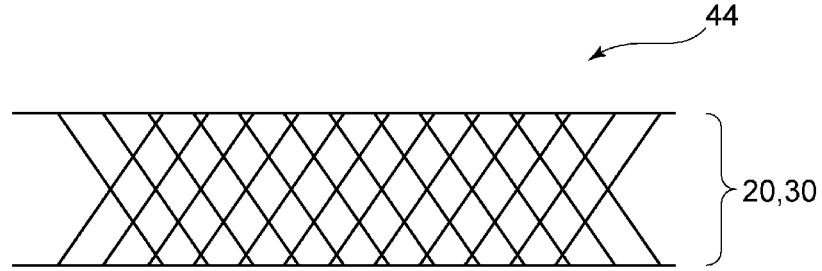

Also, as illustrated in FIG. 4(c), if the two louver structure regions (20, 30) present inside the film 44 overlap each other excessively, the angle of aperture may become narrower.

It is speculated that such a phenomenon occurs because the difference between the refractive indices of the high refractive index plate-shaped regions and the low refractive index plate-shaped regions is reduced, and light diffusion caused by the respective louver structures occurs insufficiently.

From this viewpoint, as illustrated in FIG. 4(a), since the anisotropic light diffusion film 40 of the present invention has an overlapping louver structure region 50 in which the upper end of a first louver structure region 20 and the lower end of a second louver structure region 30 overlap each other, the problems described above are solved, and thus anisotropy in light diffusion can be maintained stably.

3. First Louver Structure Region

The anisotropic light diffusion film of the present invention is characterized by having a first louver structure region in which plural plate-shaped regions having different refractive indices are alternately arranged in parallel along any one direction along the film plane.

Hereinafter, the first louver structure region will be explained specifically.

(1) Refractive Index

In regard to the first louver structure region, it is preferable to adjust the difference between the refractive indices of the plate-shaped regions having different refractive indices, that is, the difference between the refractive index of high refractive index plate-shaped regions and the refractive index of low refractive index plate-shaped regions, to a value of 0.01 or more.

The reason for this is that when the difference between such refractive indices is adjusted to a value of 0.01 or more, incident light can be stably reflected in the first louver structure region, and the angle of aperture of diffused light originating from the first louver structure region can be expanded more effectively.

More specifically, it is because if the difference between such refractive indices has a value of below 0.01, since the range of angle at which incident light undergoes total reflection in the louver structure is narrowed, light diffusibility substantially may not be exhibited.

Therefore, it is more preferable to adjust the difference in the refractive index between the plate-shaped regions having different refractive indices in the first louver structure region to a value of 0.05 or more, and even more preferably to a value of 0.1 or more.

Meanwhile, a larger difference between the refractive index of the high refractive index plate-shaped regions and the refractive index of the low refractive index plate-shaped regions is more preferred, but from the viewpoint of selecting the material capable of forming a louver structure, a value of about 0.3 may be considered as the upper limit.

Furthermore, in regard to the first louver structure region, it is preferable to adjust the refractive index of the plate-shaped regions having a relatively higher refractive index, to a value in the range of 1.5 to 1.7.

The reason for this is that if the refractive index of the high refractive index plate-shaped regions has a value of below 1.5, the difference between the high refractive index plate-shaped regions and the low refractive index plate-shaped regions becomes too small, and it may be difficult to obtain a desired louver structure.

On the other hand, it is because if the refractive index of the high refractive index plate-shaped regions has a value of above 1.7, compatibility between the materials in the composition for anisotropic light diffusion film may be decreased excessively.

Therefore, it is more preferable to adjust the refractive index of the high refractive index plate-shaped regions in the first louver structure region to a value in the range of 1.52 to 1.65, and even more preferably to a value in the range of 1.55 to 1.6.

Meanwhile, the refractive index of the high refractive index plate-shaped regions can be measured according to, for example, JIS K0062.

Furthermore, in regard to the first louver structure region, it is preferable to adjust the refractive index of the plate-shaped regions having a relatively lower refractive index, to a value in the range of 1.4 to 1.55.

The reason for this is that if the refractive index of such low refractive index plate-shaped regions has a value of below 1.4, rigidity of the light diffusion film thus obtainable may be decreased.

On the other hand, if the refractive index of such low refractive index plate-shaped regions has a value of above 1.55, the difference between the refractive index of the low refractive index plate-shaped regions and the refractive index of the high refractive index plate-shaped regions becomes too small, and it may be difficult to obtain a desired louver structure.

Therefore, it is more preferable to adjust the refractive index of the low refractive index plate-shaped regions in the first louver structure region to a value in the range of 1.42 to 1.54, and even more preferably to a value in the range of 1.44 to 1.52.

Meanwhile, the refractive index in the low refractive index plate-shaped regions can be measured according to, for example, JIS K0062.

(2) Width

Figure 5A:
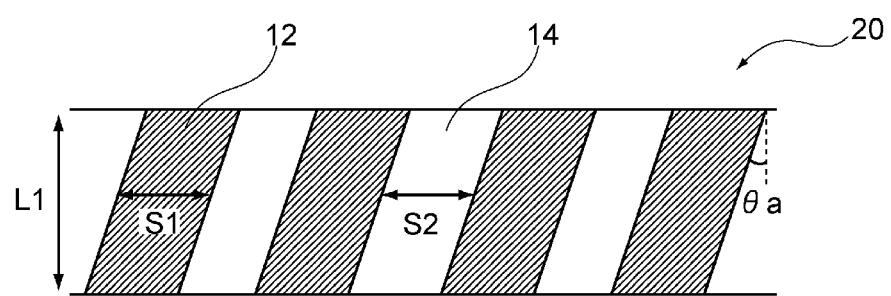
FIGS. 5(a) and 5(b) are diagrams provided to illustrate a first louver structure region.

Furthermore, as illustrated in FIG. 5(a), it is preferable, in regard to the first louver structure region 20, to adjust the widths (S1, S2) of the high refractive index plate-shaped regions 12 and the low refractive index plate-shaped regions 14 having different refractive indices, respectively to a value in the range of 0.1 μm to 15 μm.

The reason for this is that when the width of such plate-shaped regions is adjusted to a value in the range of 0.1 μm to 15 μm, incident light can be more stably reflected in the first louver structure region, and while uniformity of the intensity of diffused light in the light diffusion angle region originating from the first louver structure region can be further enhanced, the angle of aperture of diffused light can be expanded more effectively.

That is, it is because if the width of such plate-shaped regions has a value of below 0.1 μm, it may be difficult to exhibit anisotropic light diffusion, irrespective of the incident angle of incident light. On the other hand, it is because if such width has a value of above 15 μm, the amount of light that travels straight within the louver structure increases, and uniformity of anisotropic light diffusion may be deteriorated.

Therefore, it is more preferable to adjust the widths of the plate-shaped regions having different refractive indices in the first louver structure region, respectively to a value in the range of 0.5 μm to 10 μm, and even more preferably to a value in the range of 1 μm to 5 μm.

Meanwhile, the width, length or the like of the plate-shaped regions that constitute louvers can be measured by observing cross-sections of the film under an optical digital microscope.

(3) Inclination Angle

Furthermore, as illustrated in FIG. 5(a), it is preferable that in the first louver structure region, the plural high refractive index plate-shaped regions 12 and the plural low refractive index plate-shaped regions 14, respectively having different refractive indices, are extended respectively at a constant inclination-angle θa with respect to the film thickness direction.

The reason for this is that when the respective inclination angles θa of the plate-shaped regions are set constant, incident light can be more stably reflected in the first louver structure region, and while uniformity of the intensity of diffused light in the light diffusion angle region originating from the first louver structure region is further enhanced, the angle of aperture of diffused light can be expanded more effectively.

Meanwhile, θa means the inclination angle (°) of the plate-shaped regions obtainable when the angle of the film surface measured in a cross-section obtained by cutting the film at a plane perpendicular to the louver structure extended along any one direction along the film plane, with respect to the normal line is defined as 0'.

More specifically, as illustrated in FIG. 5(a), θa means a narrower angle among the angles formed by the normal line of the upper end surface of the first louver structure region and the uppermost part of the plate-shaped regions. Meanwhile, based on the inclination angle in the case in which the plate-shaped regions are inclined to the right side as illustrated in FIG. 5(a), the inclination angle in the case in which the plate-shaped regions are inclined to the left side is indicated as a negative value.

Figure 5B:
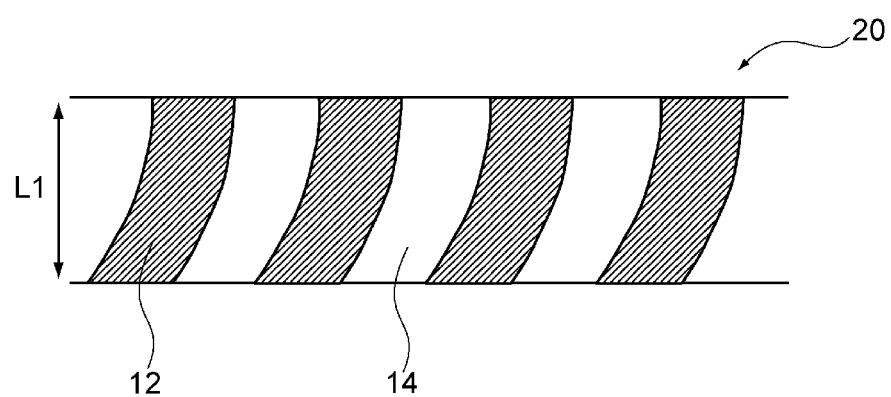

Furthermore, as illustrated in FIG. 5(b), it is preferable that plate-shaped regions (12, 14) having different refractive indices in the first louver structure region are bent in the upper part or in the lower part along the film thickness direction (FIG. 5(b) shows the case in which the plate-shaped regions are bent in the lower part).

The reason for this is that when the louver structure is bent, the balance between reflection and transmission in the first louver structure region is made complicated, and the angle of aperture of diffused light can be expanded effectively.

Meanwhile, such a bent louver structure may be considered to be obtainable by decreasing the rate of the polymerization reaction caused by ultraviolet radiation in the thickness direction of the coating film.

Specifically, such a bent louver structure can be formed by suppressing the illuminance of ultraviolet radiation emitted from a linear light source, and moving the coating film in the state of being irradiated, at a low speed.

(4) Thickness

Furthermore, it is preferable to adjust the thickness of the first louver structure region, that is, the thickness L1 of the portion where the louver structure is present in the direction of the normal line of the film surface illustrated in FIGS. 5(a) and 5(b), to a value in the range of 50 μm to 500 μm.

The reason for this is that when the thickness of the first louver structure region is adjusted to a value in such a range, the length of the louver structure along the film thickness direction can be stably secured, incident light can be more stably reflected in the first louver structure region, and while uniformity of the intensity of diffused light in the light diffusion angle region originating from the first louver structure region can be further enhanced, the angle of aperture of diffused light can be further expanded.

That is, it is because if the thickness L1 of such first louver structure region has a value of below 50 μm, uniformity of the intensity of diffused light in the light diffusion angle region may be deteriorated, or the angle of aperture of diffused light may be insufficient.

On the other hand, it is because if the thickness L1 of such first louver structure region has a value of above 500 μm, when the louver structure is formed by irradiating active energy radiation to the composition for anisotropic light diffusion film, the direction of progress, of photopolymerization is diffused by the louver structure initially formed, and it may be difficult to form a desired louver structure.

Therefore, it is more preferable to adjust the thickness L1 of the first louver structure region to a value in the range of 70 μm to 300 μm, and even more preferably to a value in the range of 80 μm to 200 μm.

(5) Materials (5)-1 High Refractive Index Polymerizable Compound

Furthermore, in regard to the first louver structure region, there are no particular limitations on the kind of the material for constructing the plate-shaped regions having a relatively higher refractive index among the plate-shaped regions having different refractive indices, but it is preferable to use a (meth)acrylic acid ester polymer containing plural aromatic rings as a main component thereof.

The reason for this is that with such a material, the louver structure as the first louver structure region can be formed efficiently, and also, while uniformity of the intensity of diffused light in the light diffusion angle region originating from the first louver structure region is further enhanced, the angle of aperture of diffused light can be further expanded.

That is, it is speculated that when a particular (meth) acrylic acid ester polymer is used as a main component of the high refractive index plate-shaped regions (hereinafter, may be referred to as component (A)), on the occasion of forming the first louver structure region, the rate of polymerization of the monomer component that forms the component (A) by polymerization (hereinafter, may be referred to as monomeric component (A)), can be made faster than the rate of polymerization of the monomer component (hereinafter, may be referred to as monomeric component (B)) that forms a main component of the plate-shaped region having a refractive index that will be described below, by polymerization (hereinafter, may be referred to as component (B)).

It is also speculated that a predetermined difference is caused in the rates of polymerization between these monomer components so that the two monomer components are prevented from copolymerizing uniformly, and more specifically, the compatibility of the two monomer components can be decreased to a predetermined extent, to thereby effectively decrease copolymerizability between the two monomer components.

As a result, a louver structure in which the plate-shaped regions originating from the component (A) and the plate-shaped regions originating from the component (B) are alternately extended along any one direction along the film plane, can be formed efficiently by irradiation of active energy radiation.

Furthermore, when a particular (meth)acrylic acid ester is used as the monomeric component (A), compatibility with the monomeric component (B) can be decreased to a predetermined extent, and the louver structure can be formed more efficiently.

In addition, when a particular (meth)acrylic acid ester polymer is incorporated as the component (A), the refractive index of the plate-shaped regions originating from the component (A) in the louver structure can be increased, and the difference between the refractive index of the plate-shaped regions originating from the component (A) and the refractive index of the plate-shaped regions originating from the component (B) can be adjusted to a value greater than or equal to a predetermined value.

Therefore, when a particular (meth)acrylic acid ester polymer is incorporated as the component (A), together with the characteristics of the component (B) that will be described below, a louver structure in which plate-shaped regions having different refractive indices are alternately extended along any one direction along the film plane can be obtained efficiently.

Accordingly, while uniformity of the intensity of diffused light in the light diffusion angle region can be enhanced, the first louver structure region in which the angle of aperture of diffused light is effectively expanded can be obtained.

Meanwhile, the "(meth)acrylic acid ester containing plural aromatic rings" means a compound having plural aromatic rings in the ester moiety of a (meth)acrylic acid ester.

Furthermore, "(meth)acrylic acid" means both acrylic acid and methacrylic acid.

Furthermore, examples of such a (meth)acrylic acid ester containing plural aromatic compounds as a monomeric component (A) that constitutes the component (A), include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate, and compounds in which some of hydrogen atoms on the aromatic ring have been substituted by halogen, alkyl, alkoxy, halogenated alkyl, or the like.

Furthermore, it is preferable to incorporate a compound containing a biphenyl ring as the (meth)acrylic acid ester containing plural aromatic rings as the monomeric component (A) that constitutes the component (A), and it is particularly preferable to incorporate a biphenyl compound represented by the following formula (1):

[Chemical Formula 2]

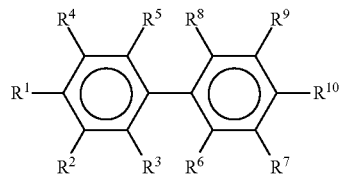

(1)

wherein in formula (1), $R^1$ to $R^{10}$ are respectively independent of one another; at least one of $R^1$ to $R^{10}$ represents a substituent represented by the following formula (2); and the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

[Chemical Formula 3]

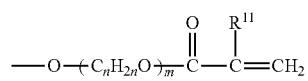

(2)

wherein in formula (2), $R^{11}$ represents a hydrogen atom or a methyl group; the number of carbon atoms n represents an integer from 1 to 4; and the number of repetitions m represents an integer from 1 to 10.

The reason for this is speculated to be that when a biphenyl compound having a particular structure is incorporated as the monomeric component (A) that constitutes the component (A), the rate of polymerization of the monomeric component (A) can be made faster than the rate of polymerization of the monomeric component (B).

Furthermore, it is speculated that compatibility with the monomeric component (B) can be decreased more easily to a predetermined extent, and by increasing the refractive index of the plate-shaped regions originating from the component (A) in the louver structure, the difference between the refractive index of the plate-shaped regions originating from the component (A) and the refractive index of the plate-shaped regions originating from the component (B) can be adjusted more easily to a value greater than or equal to a predetermined value.

Moreover, such a compound is liquid in the state of monomer before being photocured, and the compound can be uniformly mixed with urethane (meth)acrylate, which is a representative example of the monomeric component (B), even if a diluent solvent or the like is not used.

Furthermore, when $R^1$ to $R^{10}$ in the formula (1) include any one of an alkyl group, an alkoxy group, a halogenated alkyl group, a hydroxyalkyl group, and a carboxyalkyl group, it is preferable to adjust the number of carbon atoms of the alkyl moiety thereof to a value in the range of 1 to 4.

The reason for this is that if such number of carbon atoms has a value of above 4, the rate of polymerization of the monomeric component (A) may be decreased, or the refractive index of the plate-shaped regions originating from the component (A) In the louver structure may become too low, and it may be difficult to efficiently form a predetermined louver structure in the first louver structure region.

Therefore, when $R^1$ to $R^{10}$ in the formula (1) include any one of an alkyl group, an alkoxy group, a halogenated alkyl group, a hydroxyalkyl group and a carboxyalkyl group, it is more preferable to adjust the number of carbon atoms of the alkyl moiety to a value in the range of 1 to 3, and even more preferably to a value in the range of 1 to 2.

Furthermore, it is preferable that $R^1$ to $R^{10}$ in the formula (1) each represent a substituent other than a halogenated alkyl group or a halogen atom, that is, a substituent that does not contain halogen.

The reason for this is that generation of dioxin is prevented when the anisotropic light diffusion film is incinerated or the like, and therefore, it is preferable from the viewpoint of environment protection.

Meanwhile, in regard to conventional anisotropic light diffusion films having a louver structure, on the occasion of obtaining a predetermined louver structure, it has been general to subject the monomer components to halogen substitution for the purpose of increasing the refractive indices of the monomer components.

From this viewpoint, when a biphenyl compound represented by formula (1) is used, even if halogen substitution is not implemented, a high refractive index can be obtained.

Therefore, when a biphenyl compound represented by formula (1) is used as the monomeric component (A), even if the biphenyl compound does not contain halogen, the anisotropic light diffusion film can exhibit satisfactory incident angle dependency.

Furthermore, it is preferable that any one of $R^2$ to $R^9$ in the formula (1) represent a substituent represented by formula (2).

The reason for this is that when the position of the substituent represented by formula (2) is set to a position other than the position of $R^1$ and the position of $R^{10}$, the molecules of the monomeric component (A) can be effectively prevented from being aligned and crystallized in the stage before photocuring.

Furthermore, the compound is liquid in the state of monomer before being photocured, and the compound can be apparently uniformly mixed with the monomeric component (B) even if a diluent solvent or the like is not used.

It is because thereby, aggregation/phase separation at a fine level of the monomeric component (A) and the monomeric component (B) is enabled in the stage of photocuring, and a first louver structure region having a predetermined louver structure can be obtained more efficiently.

Furthermore, from the same viewpoint, it is particularly preferable that any one of $R^3$, $R^5$, $R^6$ and $R^8$ in the formula (1) represent a substituent represented by formula (2).

Furthermore, it is usually preferable that the number of repetitions m for the substituent represented by formula (2) is defined as an integer from 1 to 10.

The reason for this is that if the number of repetitions m has a value of above 10, the oxyalkylene chain that links the polymerization site and the biphenyl ring becomes too long, and polymerization of the molecules of the monomeric component (A) at the polymerization site may be inhibited thereby.

Therefore, it is more preferable that the number of repetitions m for the substituent represented by formula (2) is defined as an integer from 1 to 4, and particularly preferably as an integer from 1 to 2.

Meanwhile, from the same viewpoint, it is usually preferable that the number of carbon atoms n for the substituent represented by formula (2) is defined as an integer from 1 to 4.

Furthermore, from the viewpoint that the position of a polymerizable carbon-carbon double bond serving as a polymerization site is so close to the biphenyl ring that the biphenyl ring imposes steric hindrance, and the rate of polymerization of the component (A) is decreased, it is more preferable that the number of carbon atoms n for the substituent represented by formula (2) is defined as an integer from 2 to 4, and particularly preferably as an integer from 2 to 3.

Furthermore, specific examples of the biphenyl compound represented by formula (1) include compounds represented by the following formulas (3) and (4):

[Chemical Formula 4]

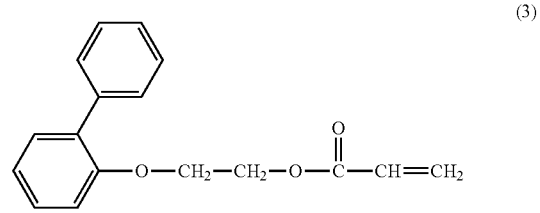

(3)

[Chemical Formula 5]

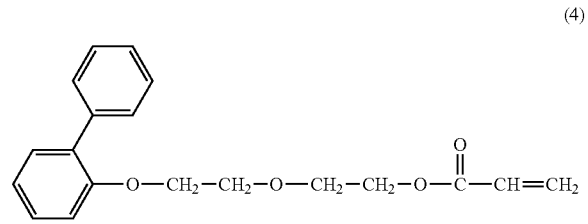

(4)

Furthermore, it is preferable to adjust the molecular weight of the monomeric component (A) that constitutes the component (A) to a value in the range of 200 to 2,500.

The reason for this is that when the molecular weight of the monomeric component (A) is adjusted to a predetermined range, the rate of polymerization of the monomeric component (A) can be made faster, and copolymerizability of the monomeric component (A) and the monomeric component (B) can be decreased more effectively.

As a result, when the composition is photocured, a louver structure in which plate-shaped regions originating from the component (A) and plate-shaped regions originating from the component (B) are alternately extended along any one direction along the film plane, can be formed more efficiently.

That is, it is because if the molecular weight of the monomeric component (A) has a value of below 200, for example, the positions of plural aromatic rings and the positions of the polymerizable carbon-carbon double bonds become too close, so that the rate of polymerization is decreased by steric hindrance and approaches the rate of polymerization of the monomeric component (B), and thus copolymerization with the monomeric component (B) is prone to occur. On the other hand, it is because if the weight average molecular weight of the monomeric component (A) has a value of above 2,500, the rate of polymerization of the monomeric component (A) is decreased and approaches the rate of polymerization of the monomeric component (B), and copolymerization with the monomeric component (B) is prone to occur; as a result, it may be difficult to form a louver structure efficiently.

Therefore, it is more preferable to adjust the molecular weight of the monomeric component (A) to a value in the range of 240 to 1,500, and even more preferably to a value in the range of 260 to 1,000.

Meanwhile, the molecular weight of the monomeric component (A) can be determined from the calculated value obtainable from the composition of the molecule and the atomic amount of constituent atoms, or can be measured as the weight average molecular weight using gel permeation chromatography (GPC).

Furthermore, it is preferable that the monomeric component (A) that forms the part with a higher refractive index in the louver structure is composed of a single component.

The reason for this is that when such a configuration is adopted, the fluctuations in the refractive index of the plate-shaped regions originating from the component (A) in the louver structure, that is, the plate-shaped regions having a high refractive index, can be suppressed effectively, and thereby a first louver structure region having a predetermined louver structure can be obtained more efficiently.

That is, when the compatibility of the monomeric component (A) with the monomeric component (B) is low, for example, when the monomeric component (A) is a halogen-based compound or the like, another monomeric component (A) (for example, a non-halogen-based compound) may be used in combination as a third component for compatibilizing the monomeric component (A) with the monomeric component (B).

However, in this case, the refractive index for the plate-shaped regions having a high refractive index, which originate from the component (A), may fluctuate or decrease, due to the influence of such a third component.

As a result, the difference in the refractive index with the plate-shaped regions having a low refractive index, which originate from the component (B), may become non-uniform, or may be prone to decrease excessively.

Therefore, it is preferable to select a high refractive index monomer component having compatibility with the monomeric component (B), and to use that monomer component as a single monomeric component (A).

In addition, for example, biphenyl compounds represented by formulas (3) and (4) as the monomeric component (A) have compatibility with the monomeric component (B), and therefore, the biphenyl compounds can each be used as a single monomeric component (A).

(5)-2 Low Refractive Index Polymerizable Compound

Furthermore, in regard to the first louver structure region, there are no particular limitations on the kind of the material for constituting the plate-shaped regions having a lower refractive index among the plate-shaped regions having different refractive indices, but it is preferable to use a polymer of urethane (meth)acrylate as a main component.

The reason for this is that when such a material is used, a louver structure as the first louver structure region can be formed efficiently, and also, the incident angle dependency originating from the first louver structure region and the anisotropy in light diffusion can be further enhanced.

That is, it is because when a polymer of urethane (meth) acrylate is used as a main component of the low refractive index plate-shaped regions (component (B)), the difference between the refractive index of the plate-shaped regions originating from the component (A) and the refractive index of the plate-shaped regions originating from the component (B) can be adjusted more easily, and also, fluctuations in the refractive index of the plate-shaped regions originating from the component (B) can be suppressed effectively, so that a first louver structure region having a predetermined louver structure can be obtained more efficiently.

Meanwhile, (meth)acrylate means both acrylate and methacrylate.

First, the urethane (meth)acrylate as the monomeric component (B) that constitutes the component (B) is formed from (a) a compound containing at least two isocyanate groups; (b) a polyol compound, preferably a diol compound, and particularly preferably a polyalkylene glycol; and (c) a hydroxyalkyl (meth)acrylate.

Meanwhile, the monomeric component (B) is intended to also include an oligomer having a repeating unit of urethane bond.

Among these, examples of the compound containing at least two isocyanate groups, which is the component (a), include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds such as ethylene glycol, propylene glycol, neopentyl glycol, trimethylolpropane, and castor oil (for example, xylylene diisocyanate-based trifunctional adduct).

Furthermore, among those described above, the component (a) is preferably an alicyclic polyisocyanate.

The reason for this is that when an alicyclic polyisocyanate is used, it is easy to provide differences in the reaction rates of various isocyanate groups as compared with aliphatic polyisocyanates, due to the relationship such as conformation, and molecular design of urethane (meth) acrylate thus obtainable is facilitated.

Furthermore, the component (a) is particularly preferably an alicyclic diisocyanate.

The reason for this is that when an alicyclic diisocyanate is used, for example, the component (a) is prevented from reacting only with the component (b), or the component (a) is prevented from reacting only with the component (c), and the component (a) can be allowed to react reliably with the component (b) and the component (c), so that generation of excess side products can be prevented.

As a result, fluctuations in the refractive index of the plate-shaped regions originating from the component (B) in the first louver structure region, that is, the low refractive index plate-shaped regions, can be suppressed effectively.

Also, when an alicyclic diisocyanate is used, the compatibility between the monomeric component (B) thus obtainable and the biphenyl compound having a particular structure, which is a representative example of the monomeric component (A), can be decreased to a predetermined extent, and a louver structure can be formed more efficiently, as compared with an aromatic diisocyanate.

Furthermore, when an alicyclic diisocyanate is used, since the refractive index of the monomeric component (B) thus obtainable can be made smaller as compared with an aromatic diisocyanate, the difference between the refractive index of the monomeric component (B) and the refractive index of the biphenyl compound having a particular structure as a representative example of the monomeric component (A) is increased, and light diffusibility can be exhibited more reliably, while a louver structure having high uniformity of the intensity of diffused light in the light diffusion angle region can be formed more efficiently.

Furthermore, among such alicyclic diisocyanates, from the viewpoint of having a large difference in the reactivity of two isocyanate groups, the alicyclic diisocyanate is particularly preferably isophorone diisocyanate (IPDI).

Furthermore, among the components that form urethane (meth)acrylate as the monomeric component (B), examples of the polyalkylene glycol as the component (b) include polyethylene glycol, polypropylene glycol, polybutylene glycol, and polyhexylene glycol, and among them, polypropylene glycol is particularly preferred.

The reason for this is that since polypropylene glycol has low viscosity, this component can be handled solventlessly.

Furthermore, it is because, with polypropylene glycol, when the monomeric component (B) is cured, the component forms a satisfactory soft segment in the relevant cured product, and handleability or decorativeness of the anisotropic light diffusion film can be enhanced effectively.

Meanwhile, the weight average molecular weight of the monomeric component (B) can be adjusted by the weight average molecular weight of the component (b). Here, the weight average molecular weight of the component (b) is usually 2,300 to 19,500, preferably 4,300 to 14,300, and particularly preferably 6,300 to 12,300.

Furthermore, among the components that form urethane (meth)acrylate as the monomeric component (B), examples of the hydroxyalkyl (meth)acrylate as the component (c) include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Furthermore, from the viewpoint of decreasing the rate of polymerization of the urethane (meth)acrylate thus obtainable, and forming a predetermined louver structure more efficiently, the component is more preferably a hydroxyalkyl methacrylate, and even more preferably 2-hydroxyethyl methacrylate.

Furthermore, synthesis of the urethane (meth)acrylate based on the components (a) to (c) can be carried out by a conventional method.

In this case, it is preferable to adjust the mixing ratio of the components (a) to (c) to the ratio of component (a):component (b):component (c)=1 to 5:1:1 to 5.

The reason for this is that when such a mixing ratio is employed, a urethane (meth)acrylate in which the two hydroxyl groups carried by the component (b) react with one of the isocyanate groups respectively carried by the components (a) to be bonded thereto, and the hydroxyl groups carried by the component (c) react respectively with the other isocyanate group respectively carried by the two components (a) to be bonded, can be efficiently synthesized.

Therefore, it is more preferable to adjust the mixing ratio of the components (a) to (c) to the ratio of component (a):component (b):component (c)=1 to 3:1:1 to 3, and even more preferably to the ratio of 2:1:2.

Furthermore, it is preferable to adjust the weight average molecular weight of the monomeric component (B) that constitutes the component (B) to a value in the range of 3,000 to 20,000.

The reason for this is speculated that when the weight average molecular weight of the monomeric component (B) is adjusted to a predetermined range, a predetermined difference is caused between the rates of polymerization of the monomeric component (A) and the monomeric component (B), and thus copolymerizability of the two components can be effectively decreased.

As a result, when photocured, a louver structure in which plate-shaped regions originating from the component (A) and plate-shaped regions originating from the component (B) are alternately extended, can be formed efficiently.

That is, it is because if the weight average molecular weight of the monomeric component (B) has a value of below 3,000, the rate of polymerization of the monomeric component (B) is increased and approaches closer to the rate of polymerization of the monomeric component (A), so that copolymerization with the monomeric component (A) is likely to occur, and as a result, it may be difficult to form a louver structure efficiently. On the other hand, it is because if the weight average molecular weight of the monomeric component (B) has a value of above 20,000, it may be difficult to form a louver structure in which plate-shaped regions originating from the component (A) and the component (B) are alternately extended along any one direction along the film plane, or compatibility with the monomeric component (A) may be decreased excessively, and the monomeric component (A) may be precipitated in the stage of application of the composition for anisotropic light diffusion film.

Therefore, it is more preferable to adjust the weight average molecular weight of the monomeric component (B) to a value in the range of 5,000 to 15,000, and even more preferably to a value in the range of 7,000 to 13,000.

Meanwhile, the weight average molecular weight of the monomeric component (B) can be measured using gel permeation chromatography (GPC), or can be calculated from the structural formula based on the atomic amounts of constituent atoms.

Furthermore, regarding the monomeric component (B), two or more kinds having different molecular structures or different weight average molecular weights may be used in combination, but from the viewpoint of suppressing fluctuations in the refractive index of the plate-shaped regions originating from the component (B) in the louver structure, it is preferable to use only one kind.

That is, it is because when plural monomeric component (B) are used, the refractive index in the plate-shaped regions having a refractive index, which originate from the component (B), may fluctuate or increase, and the difference between the refractive index of the plate-shaped regions with a high refractive index, originating from the component (B), and the refractive index of the plate-shaped regions with a low refractive index, originating from the component (A), may become non-uniform or may decrease excessively.

4. Second Louver Structure Region

The anisotropic light diffusion film of the present invention is characterized by having a second louver structure region in which plural plate-shaped regions having different refractive indices are alternately arranged in parallel along any one direction along the film plane, on the upper side of the first louver structure region described above, along the film thickness direction described above.

Meanwhile, since the configuration of the second louver structure region is basically the same as the configuration of the first louver structure region, further explanation will not be repeated here.

However, from the viewpoint that the second louver structure region accomplishes an auxiliary role for the first louver structure region in connection with light diffusion, it is preferable to adjust the thickness of the second louver structure region to a value in the range of 10 μm to 200 μm, more preferably to a value in the range of 20 μm to 150 μm, and even more preferably to a value in the range of 40 μm to 100 μm.

Furthermore, it is preferable that the value obtained by subtracting the thickness of the overlapping louver structure region from the sum of thicknesses of the first louver structure region and the second louver structure region, is adjusted to a value of 80% or more of the film thickness (100%).

The reason for this is that when the proportion of the sum of the regions having louver structures formed therein with respect to the entire film, is adjusted to a value in such a range, uniformity of the intensity of diffused light in the light diffusion angle region originating from the first louver structure region and the second louver structure region can be enhanced more effectively, while the angle of aperture of diffused light can be further expanded.

That is, it is because if the proportion of the sum of the regions in which the louver structure is formed with respect to the entire film has a value of below 80%, the absolute amount of the louver structure is insufficient, and uniformity of the intensity of diffused light in the light diffusion angle region may become insufficient, or the angle of aperture of diffused light may be insufficient.

Therefore, it is more preferable that the value obtained by subtracting the thickness of the overlapping louver structure region from the sum of thicknesses of the first louver structure region and the second louver structure region, is adjusted to a value of 90% or more, and even more preferably adjusted to a value of 95% or more, relative to the film thickness (100%).

5. Overlapping Louver Structure Region

The anisotropic light diffusion film of the present invention is characterized by having an overlapping louver structure region in which the upper end of a first louver structure region and the lower end of a second louver structure overlap each other.

Hereinafter, the overlapping louver structure region will be described specifically.

(1) Shape

The overlapping louver structure region 50 according to the present invention is not particularly limited as long as the upper end of a first louver structure region 20 and the lower end of a second louver structure region 30 are formed to overlap each other.

Figure 6A:
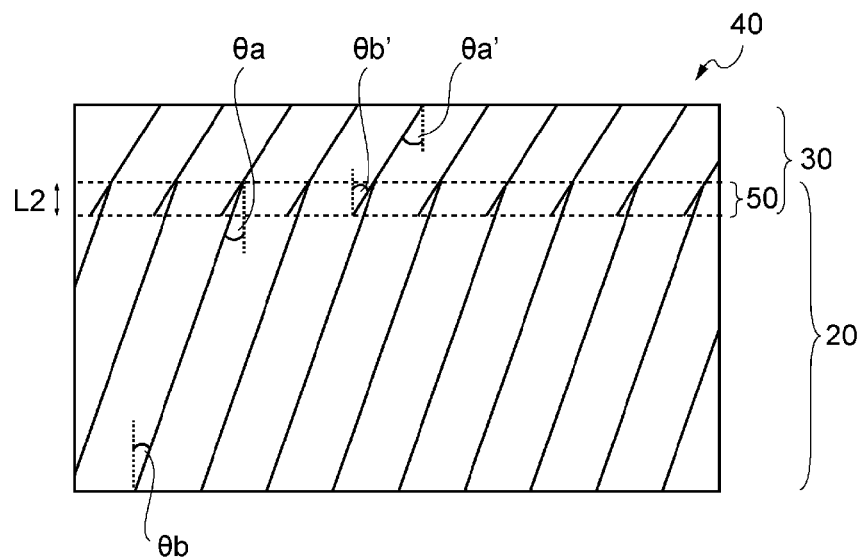
FIGS. 6(a) to 6(c) are other diagrams provided to illustrate an overlapping louver structure region.
Figure 6B:
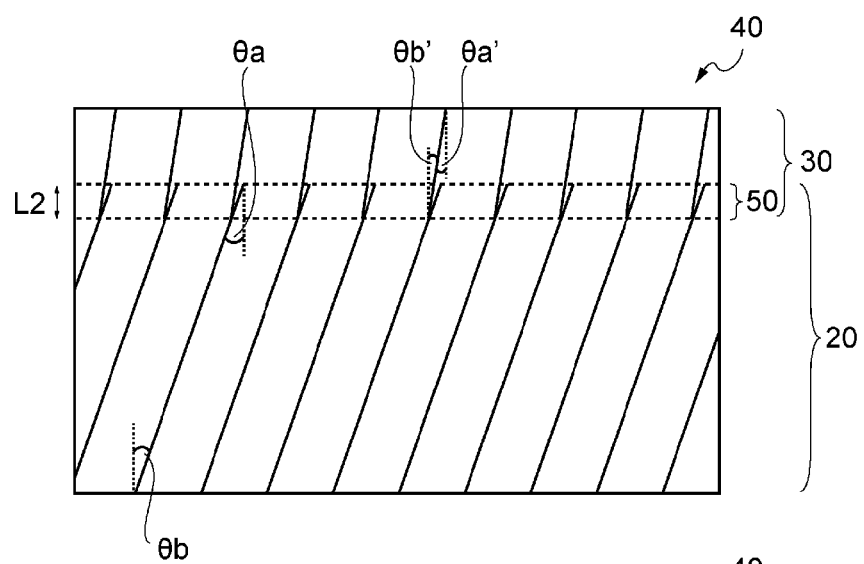

More specifically, as illustrated in FIGS. 6(a) and 6(b), it is preferable that the overlapping louver structure is an overlapping louver structure region 50 in which the tips of any one of the first louver structure region 20 and the second louver structure region 30 are brought into contact with the vicinity of the tips of the plate-shaped region originating from the other louver structure region.

The reason for this is that when the overlapping louver structure region is configured as such, louver structures can be disposed efficiently with a limited film thickness, and while uniformity of the intensity of diffused light in the light diffusion angle region is enhanced, the light diffusion angle region can be expanded more effectively.

Figure 6C:
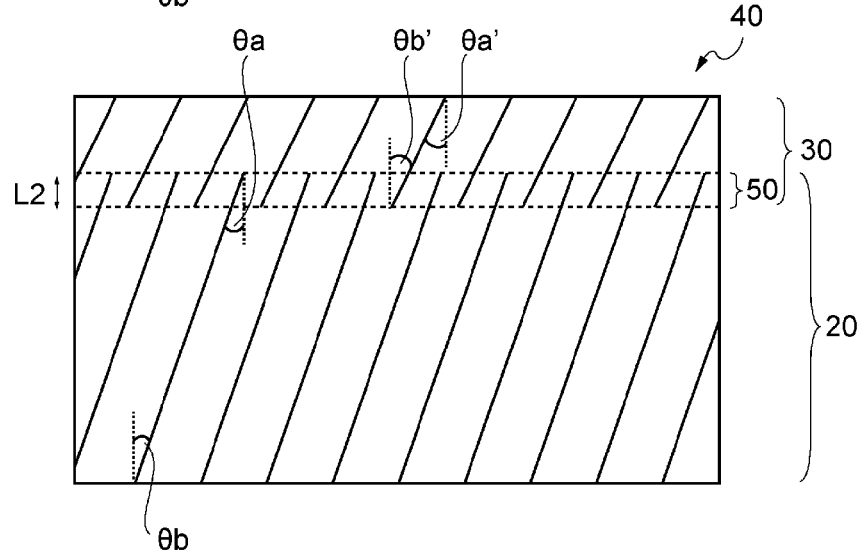

Meanwhile, as illustrated in FIG. 6(c), an overlapping louver structure region 50 in which the respective plate-shaped regions originating from the first louver structure region 20 and the second louver structure region 30 overlap in a non-contact state, may also be used.

(2) Combination of Inclination Angles

Furthermore, it is preferable to adjust the difference between the inclination angles of the plate-shaped regions respectively originating from the first louver structure region and the second louver structure region, to a value of 1° or more.

That is, as illustrated in FIG. 6(a), it is preferable to adjust the absolute value of the difference between the inclination angle θa of the plate-shaped region originating from the first louver structure and the inclination angle θb' originating from the second louver structure region, to a value of 1° or more.

The reason for this is that when the absolute value of such a difference of the inclination angles is adjusted to a value of 1° or more, the light diffusion angle region can be expanded more effectively.

That is, it is because if the absolute value of such a difference has a value of below 1°, the difference in the incident angle dependency of the first louver structure region and the second louver structure region becomes insufficient, and it may be difficult to expand the light diffusion angle region effectively.

On the other hand, if the absolute value of such a difference in the inclination angle has an excessively large value, diffused light is independently generated correspondingly to each of the first and second louver structure regions, and it may be difficult to expand the angle of aperture of diffused light effectively.

Therefore, it is more preferable to adjust the absolute value of the difference between the inclination angle θa of the plate-shaped regions originating from the first louver structure region and the inclination angle θb' originating from the second louver structure region, to a value in the range of 2° to 30°, and even more preferably to a value in the range of 5° to 20°.

Meanwhile, θa and θb' mean the inclination angles(°) of the plate-shaped regions when the angle of the film surface measured in a cross-section obtained by cutting the film at a plane perpendicular to the louver structure extended along any one direction along the film plane, with respect to the normal line is defined as 0°.

More specifically, as illustrated in FIGS. 6(a) to 6(c), θa means a narrower angle among the angles formed by the normal line of the upper end surface of the first louver structure region and the uppermost part of the plate-shaped regions.

Furthermore, θb' means a narrower angle among the angles formed by the normal line of the lower end surface of the second louver structure region and the lowermost part of the plate-shaped regions.

Furthermore, based on the inclination angle in the case in which the plate-shaped regions are inclined to the right side as illustrated in FIGS. 6(a) to 6(c), the inclination angle in the case in which the plate-shaped regions are inclined to the left side is indicated as a negative value.

Meanwhile, as illustrated in FIGS. 6(a) to 6(c), θb means a narrower angle among the angles formed by the normal line of the lower end surface of the first louver structure region and the lowermost part of the plate-shaped regions, and θa' means a narrower angle among the angles formed by the normal line of the upper end surface of the second louver structure and the uppermost part of the plate-shaped regions.

Furthermore, it is preferable to adjust the absolute value of the inclination angle of the plate-shaped regions originating from the second louver structure region, to a value larger than the absolute value of the inclination angle of plate-shaped regions having different refractive indices, which originate from the first louver structure region.

The reason for this is that when such a configuration is employed, plate-shaped regions having a sufficient length along the film thickness direction can be obtained in the second louver structure region that is relatively difficult to form, compared with the first louver structure region, and the light diffusion angle region can be expanded more effectively.

(3) Thickness

Furthermore, it is preferable to adjust the thickness L2 of the overlapping louver structure region to a value in the range of 1 μm to 40 μm.

The reason for this is that when the thickness L2 of the overlapping louver structure region is adjusted to a value in such a range, the overlapping state of the first louver structure region and the second louver structure region in the overlapping louver structure region can be adjusted to an appropriate extent, and therefore, generation of scattered light in a louver structure-unformed section between the respective louver structure regions can be suppressed, while anisotropy in light diffusion can be maintained more stably.

That is, it is because if the thickness L2 of the overlapping louver structure region has a value of below 1 µm, scattered light is likely to be generated in the connection area of the respective louver structure regions, and it may be difficult to stably maintain anisotropy in light diffusion.

On the other hand, it is because if the thickness L2 of the overlapping louver structure region has a value of above 40 µm, the efficiency of extraction of diffused light caused by anisotropic light diffusion may be decreased.

That is, the overlapping louver structure region may be considered to have a smaller difference between the refractive indices of adjoining plate-shaped regions as compared with the first louver structure region and the second louver structure region, and if the thickness L2 of the overlapping louver structure region is too long, a loss in diffused light in that region is assumed.

Therefore, it is more preferable to adjust the thickness L2 of the overlapping louver structure region to a value in the range of 3 µm to 35 µm, and even more preferably to a value in the range of 5 µm to 30 µm.

Furthermore, it is preferable to adjust the thickness of the overlapping louver structure region to a value in the range of 0.1% to 10% relative to the film thickness (100%).

The reason for this is that when the proportion of the overlapping louver structure region in the entire film is adjusted to a value in such a range, since the overlapping state of the first louver structure region and the second louver structure in the overlapping louver structure region can be adjusted to a more suitable extent, the generation of scattered light in the louver structure-unformed section between the respective louver structure regions can be suppressed, and anisotropy in light diffusion can be maintained more stably.

That is, it is because if the proportion of the overlapping louver structure region in the entire film has a value of below 0.1%, there may occur more areas in which the first louver structure region and the second louver structure region do not form an overlapping structure microscopically. Therefore, scattered light is likely to be generated in the relevant structure region, and the extraction efficiency of diffused light may be decreased.

On the other hand, it is because if the proportion of the overlapping louver structure region in the entire film has a value of above 10%, the thickness of the first or second louver structure region may be relatively insufficient.

Therefore, it is more preferable to adjust the thickness of the overlapping louver structure region to a value in the range of 0.2% to 5%, and even more preferably to a value in the range of 0.5% to 4%, relative to the film thickness (100%).

6. Total Film Thickness

Furthermore, it is preferable to adjust the total film thickness of the anisotropic light diffusion film of the present invention to a value in the range of 60 µm to 700 µm.

The reason for this is that if the total film thickness of the light diffusion film has a value of below 60 µm, the amount of incident light that travels straight within the louver structure region increases, and it may be difficult to exhibit anisotropic light diffusion. On the other hand, it is because if the total film thickness of the light diffusion film has a value of above 700 µm, when a louver structure region is formed by irradiating the composition for anisotropic light diffusion film with active energy radiation, the direction of progress of photopolymerization is diffused by the louver structure initially formed, and it may be difficult to form a desired louver structure region.

Therefore, it is more preferable to adjust the total film thickness of the anisotropic light diffusion film to a value in the range of 90 µm to 450 µm, and even more preferably to a value in the range of 120 µm to 250 µm.

Furthermore, the first louver structure region and the second louver structure region may be further formed alternately to be installed as, for example, a third louver structure region and a fourth louver structure region.

7. Combination of Inclination Angles

With the anisotropic light diffusion film of the present invention, the light diffusion characteristics can be changed by respectively regulating the inclination angle θa of the plate-shaped regions with respect to the film thickness direction in the first louver structure region, and the inclination angle θa' of the plate-shaped regions with respect to the film thickness direction in the second louver structure region.

That is, for example, as illustrated in FIG. 3(a), by varying the incident angle dependency exhibited by the respective louver structure regions, satisfactory incident angle dependency in connection with light transmission and diffusion can be realized, and also, the light diffusion incident angle region and the light diffusion angle region can be expanded effectively.

In this case, the inclination angle θa of the plate-shaped regions with respect to the film thickness direction in the first louver structure region is adjusted to a value in the range of −80° to 80°, while the inclination angle θa' of the plate-shaped regions with respect to the film thickness direction in the second louver structure region is adjusted to a value in the range of −80° to 80°, and it is preferable to adjust the absolute value of θa-θa' to a value in the range of 0° to 80°, more preferably to a value in the range of 2° to 30°, and even more preferably to a value in the range of 5° to 20°.

On the other hand, as illustrated in FIG. 3(b), when the incident angle dependency exhibited by the respective louver structure regions is overlapped, although the contribution to the expansion of the light diffusion incident angle region is small, since the total length of louvers in the film thickness direction is stably extended, uniformity of the intensity of diffused light in the light diffusion angle region can be enhanced effectively.

In this case, the inclination angle θa of the plate-shaped regions with respect to the film thickness direction in the first louver structure region is adjusted to a value in the range of −80° to 80°, while the inclination angle θa' with respect to the film thickness direction in the second louver structure region is adjusted to a value in the range of −80° to 80°, and it is preferable to adjust the absolute value of θa-θa' to a value in the range of 0° to 20°. When the increase in the angle of aperture and the uniformity of the intensity of diffused light are considered, it is more preferable to adjust the absolute value of θa-θa' to a value in the range of 2° to 15°.

Meanwhile, in regard to the anisotropic light diffusion film of the present invention, from the viewpoint of maintaining anisotropy in light diffusion, the direction of the plate-shaped regions with respect to the direction along the film plane in the first louver structure region and the second louver structure region is preferably parallel or substantially parallel as illustrated in FIGS. 3(*a*) and 3(*b*); however, the direction is not intended to be limited to this, depending on the use.

Furthermore, a blank region in which louver structures are not formed may be provided at a predetermined thickness in the lower part of the first louver structure region and the upper part of the second louver structure region.

8. Use

Figure 7:
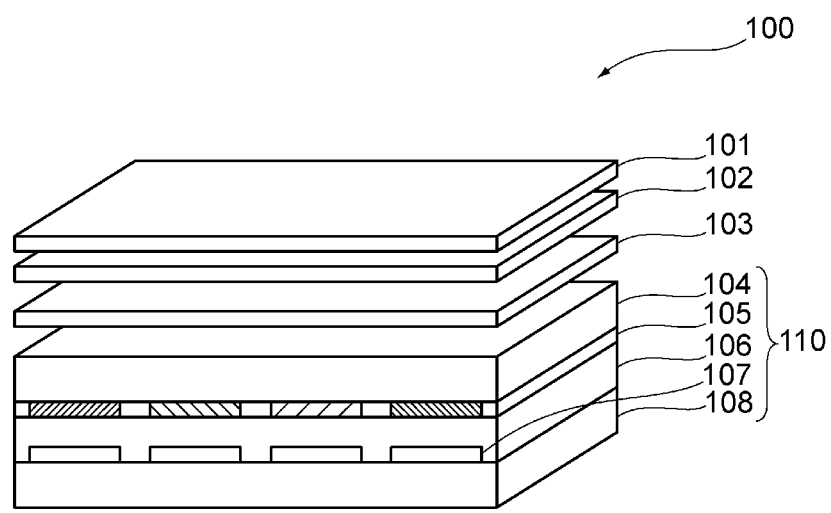
FIG. 7 is a diagram provided to illustrate an application example of an anisotropic light diffusion film in a reflective liquid crystal display device.

Furthermore, as illustrated in FIG. 7, it is preferable to use the light diffusion film of the present invention in a reflective liquid crystal display device 100.

The reason for this is that when the anisotropic light diffusion film of the present invention is used, the anisotropic light diffusion film can concentrate external light and efficiently transmit the concentrated light, can introduce the concentrated light into the interior of the liquid crystal display device, and can efficiently diffuse the light to be utilized as a light source.

Therefore, the anisotropic light diffusion film of the present invention is preferably used as a light diffusion plate 103 in a reflective liquid crystal display device 100, by being disposed on the upper surface or the lower surface of a liquid crystal cell 110 which includes glass plates (104, 108), liquid crystals 106, a mirror surface reflecting plate 107, and the like.

Meanwhile, when the anisotropic light diffusion film of the present invention is applied to a polarizing plate 101 or a retardation plate 102, a wide viewing angle polarizing plate or a wide viewing angle retardation plate may be obtained.

9. Production Method

In addition, the anisotropic light diffusion film of the present invention can be produced according to a production method including the following steps (a) to (d):

(a) a step of preparing a composition for anisotropic light diffusion film;

(b) a step of applying the composition for anisotropic light diffusion film on a process sheet, and forming a coating layer;

(c) a step of subjecting the coating layer to first active energy ray irradiation, and forming, in the lower part of the coating layer, a first louver structure region in which plural plate-shaped regions having different refractive indices are alternately arranged in parallel along any one direction along the film plane, while leaving a louver structure-unformed region in the upper part of the coating layer; and (d) a step of further subjecting the coating layer to second active energy ray irradiation, and forming, in the louver structure-unformed region, a second louver structure region in which plural plate-shaped regions having different refractive indices are alternately arranged in parallel along any one direction along the film plane.

Hereinafter, such a production method will be described specifically with reference to the drawings.

(1) Step (a): Step for preparing composition for anisotropic light diffusion film Step (a) is a step of preparing a composition for anisotropic light diffusion film.

More specifically, it is preferable to obtain a uniform mixed liquid by stirring the monomeric component (A) and the monomeric component (B) under high temperature conditions at 40° C. to 80° C.

Furthermore, simultaneously with this, it is preferable to obtain a solution of the composition for anisotropic light diffusion film by adding other additives such as the component (C) that will be described below as desired to the mixed liquid, and then while stirring the mixed liquid until the liquid becomes uniform, further adding a diluents solvent thereto as necessary so as to achieve a desired viscosity.

Meanwhile, the monomeric component (A) is a monomer component which forms, when polymerized, the component (A) that constitute high refractive index plate-shaped regions in the first louver structure region and the second louver structure region, and the monomeric component (B) is a monomer component which forms, when polymerized, the component (B) that constitutes low refractive index plate-shaped regions in the first louver structure region and the second louver structure region.

Furthermore, the details of the kinds of the monomeric component (A) and the monomeric component (B) are the same as described above, and therefore, further description will not be repeated here.

(1)-1 Refractive Index of Monomeric Component (A)

Furthermore, it is preferable to adjust the refractive index of the monomeric component (A) to a value in the range of 1.5 to 1.65.

The reason for this is that when the refractive index of the monomeric component (A) to a value in such a range, the difference between the refractive indices of the plate-shaped regions originating from the component (A) and the plate-shaped regions originating from the component (B) in the louver structure can be adjusted more easily, and an anisotropic light diffusion film having a predetermined louver structure can be obtained more efficiently.

That is, it is because if the refractive index of the monomeric component (A) has a value of below 1.5, the difference between the refractive index of the monomeric component (A) and the refractive index of the monomeric component (B) becomes too small, and it may be difficult to obtain desired incident angle dependency. On the other hand, it is because if the refractive index of the monomeric component (A) has a value of above 1.65, the difference between the refractive index of the monomeric component (A) and the refractive index of the monomeric component (B) is increased; however, the viscosity is decreased excessively, and it may be difficult to use the monomeric component (A) in combination with the monomeric component (B).

Therefore, it is more preferable to adjust the refractive index of the component (A) to a value in the range of 1.52 to 1.65, and even more preferably to a value in the range of 1.56 to 1.6.

Meanwhile, the refractive index of the monomeric component (A) described above means the refractive index of the monomeric component (A) before being cured by light irradiation.

The refractive index of the monomeric component (A) can be measured according to, for example, JIS K0062.

(1)-2 Content of Monomeric Component (A)

Furthermore, it is preferable to adjust the content of the monomeric component (A) to a value in the range of 25 parts to 400 parts by weight relative to 100 parts by weight of the monomeric component (B) that will be described below.

The reason for this is that when the content of the monomeric component (A) is adjusted to a value in such a range, while miscibility with the monomeric component (B) is maintained, copolymerizability of the two components can be decreased effectively when irradiated with light, and predetermined louvers can be formed efficiently.

That is, it is because if the content of the monomeric component (A) has a value of below 25 parts by weight, the proportion of existence of the component (A) relative to the monomeric component (B) becomes smaller, so that the width or the like of the plate-shaped regions originating from the component (A) in the louver structure becomes excessively smaller compared to the width or the like of the plate-shaped regions originating from the component (B), and it may be difficult to obtain a louver structure having satisfactory incident angle dependency. Furthermore, it is because the length of the louvers in the thickness direction of the anisotropic light diffusion film may become insufficient. On the other hand, it is because if the content of the component (A) has a value of above 400 parts by weight, the proportion of existence of the monomeric component (A) relative to the monomeric component (B) becomes larger, so that the width or the like of the plate-shaped regions originating from the component (A) in the louver structure becomes excessively larger compared to the width or the like of the plate-shaped regions originating from the component (B), and on the contrary, it may be difficult to obtain a louver structure having satisfactory incident angle dependency. Furthermore, it is because the length of the louvers in the thickness direction of the light diffusion film may become insufficient.

Therefore, it is more preferable to adjust the content of the monomeric component (A) to a value in the range of 40 parts to 300 parts by weight, and even more preferably to a value in the range of 50 parts to 200 parts by weight, relative to 100 parts by weight of the monomeric component (B).

(1)-3 Refractive Index of Monomeric Component (B)

Furthermore, it is preferable to adjust the refractive index of the monomeric component (B) to a value in the range of 1.4 to 1.55.

The reason for this is that when the refractive index of the monomeric component (B) is adjusted to a value in such a range, the difference between the refractive indices of the plate-shaped regions originating from the component (A) and the plate-shaped regions originating from the component (B) in the louver structure can be adjusted more easily, and an anisotropic light diffusion film having a predetermined louver structure can be obtained more efficiently.

That is, it is because if the refractive index of the monomeric component (B) has a value of below 1.4, the difference between the refractive index of the monomeric component (B) and the refractive index of the monomeric component (A) becomes larger, but compatibility with the monomeric component (A) is extremely deteriorated, so that it may be difficult to form a louver structure. On the other hand, if the refractive index of the monomeric component (B) has a value of above 1.55, the difference between the refractive index of the monomeric component (B) and the refractive index of the monomer component (A) becomes too small, and it may be difficult to obtain desired incident angle dependency.

Therefore, it is more preferable to adjust the refractive index of the monomeric component (B) to a value in the range of 1.45 to 1.54, and even more preferably to a value in the range of 1.46 to 1.52.

Meanwhile, the refractive index of the monomeric component (B) described above means the refractive index of the monomeric component (B) before being cured by light irradiation.

The refractive index of the monomeric component (B) can also be measured according to, for example, JIS K0062.

(1)-4 Content of Monomeric Component (B)

Furthermore, it is preferable to adjust the content of the monomeric component (B) to a value in the range of 20% to 80% by weight relative to the total amount (100% by weight) of the composition for anisotropic light diffusion film.

The reason for this is that if the content of the monomeric component (B) has a value of below 20% by weight, the proportion of existence of the monomer component (B) relative to the monomeric component (A) becomes small, so that the width or the like of the plate-shaped regions originating from the component (B) in the louver structure becomes excessively smaller compared to the width or the like of the plate-shaped regions originating from the component (A), and it may be difficult to obtain a louver structure having satisfactory incident angle dependency. Furthermore, it is because the length of the louvers in the thickness direction of the anisotropic light diffusion film may become insufficient.

On the other hand, it is because if the content of the component (B) has a value of above 80% by weight, the proportion of existence of the monomeric component (B) relative to the monomeric component (A) becomes larger, so that the width or the like of the plate-shaped regions originating from the component (B) in the louver structure becomes excessively larger compared to the width or the like of the plate-shaped regions originating from the component (A), and on the contrary, it may be difficult to obtain a louver structure having satisfactory incident angle dependency. Furthermore, it is because the length of the louvers in the thickness direction of the light diffusion film may become insufficient.

Therefore, it is more preferable to adjust the content of the monomeric component (B) to a value in the range of 30% to 70% by weight, and even more preferably to a value in the range of 40% to 60% by weight, relative to the total amount of the composition for anisotropic light diffusion film.

(1)-5 Photopolymerization Initiator

Furthermore, in regard to the composition for anisotropic light diffusion film according to the present invention, it is preferable to incorporate a photopolymerization initiator as a component (C), if desired.

The reason for this is that by incorporating a photopolymerization initiator, when active energy radiation is irradiated to the composition for anisotropic light diffusion film, a predetermined louver structure can be formed efficiently.

Here, a photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo [2-hydroxy-2-methyl-1-[4-(1-methylvinyl)phenyl]propane. Among these, one kind may be used alone, or two or more kinds may be used in combination.

Meanwhile, when a photopolymerization initiator is incorporated, it is preferable to adjust the content of photopolymerization initiator to a value in the range of 0.2 parts to 20 parts by weight, more preferably to a value in the range of 0.5 parts to 15 parts by weight, and even more preferably to a value in the range of 1 part to 10 parts by weight, relative to 100 parts by weight of the total amount of the monomeric component (A) and the monomeric component (B).

(1)-6 Other Additives

Furthermore, additives other than the compounds described above can be appropriately added to the extent that the effect of the present invention is not impaired.

Examples of such additives include an oxidation inhibitor, an ultraviolet absorber, an antistatic agent, a polymerization accelerator, a polymerization inhibitor, an infrared absorber, a plasticizer, a diluent solvent, and a leveling agent.

Meanwhile, it is generally preferable to adjust the content of such additives to a value in the range of 0.01 parts to 5 parts by weight, more preferable to a value in the range of 0.02 parts to 3 parts by weight, and even more preferably to a value in the range of 0.05 parts to 2 parts by weight, relative to 100 parts by weight of the total amount of the monomeric component (A) and the monomeric component (B).

(2) Step (b): Application Step

Figure 8A:
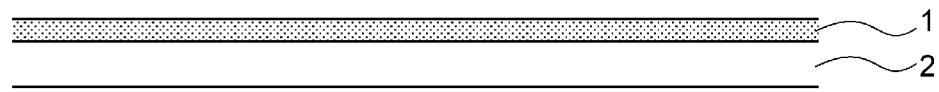
FIGS. 8(a) and 8(b) are diagrams provided to illustrate first and second active energy ray irradiation processes.
Figure 8A:

Step (b) is, as illustrated in FIG. 8(a), a step of applying a prepared composition for anisotropic light diffusion film on a process sheet 2, and forming a coating layer 1.

Regarding the process sheet, plastic films and paper can all be used.

Among these, examples of the plastic film include polyester-based films such as a polyethylene terephthalate film; polyolefin-based films such as a polyethylene film and a polypropylene film; cellulose-based films such as a triacetyl cellulose film; and polyimide-based films.

Furthermore, examples of paper include glassine paper, coated paper, and laminated paper.

Also, upon considering the processes that will be described below, the process sheet 2 is preferably a film having excellent dimensional stability against heat or active energy radiation.

Preferred examples of such film include, among those described above, a polyester-based film, a polyolefin-based film, and a polyimide-based film.

Furthermore, in regard to the process sheet, it is preferable to provide a release layer on the side of the surface coated with the composition for anisotropic light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, or an olefin-based release agent.

Meanwhile, usually, the thickness of the process sheet is preferably adjusted to a value in the range of 25 μm to 200 μm.

Furthermore, the method of applying a composition for anisotropic light diffusion film on a process sheet can be carried out by, for example, a conventionally known method such as a knife coating method, a roll coating method, a bar coating method, a blade coating method, a die coating method, or a gravure coating method.

Meanwhile, in this case, it is preferable to adjust the thickness of the coating layer to a value in the range of 100 μm to 700 μm.

(3) Step (c): First Active Energy Ray Irradiation Step

Step (c) is a step of subjecting the coating layer to first active energy ray irradiation, and forming, in the lower part of the coating layer, a first louver structure region in which plural plate-shaped regions having different refractive indices are alternately arranged in parallel along any one direction along the film plane, while leaving a louver structure-unformed region in the upper part of the coating layer.

Figure 8B:
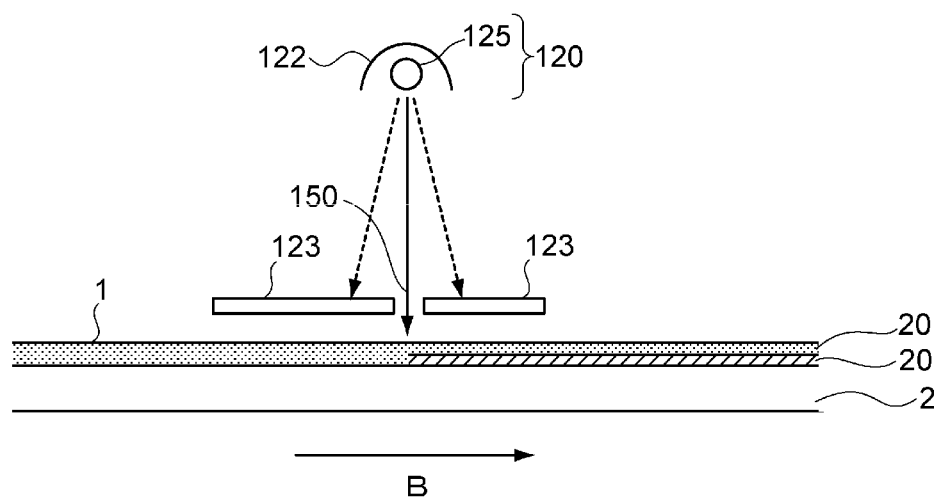

That is, as illustrated in FIG. 8(b), it is preferable to irradiate active energy radiation 150 that is composed only of direct light and having a controlled irradiation angle, to the coating layer 1 formed on the process sheet 2.

Figure 9A:
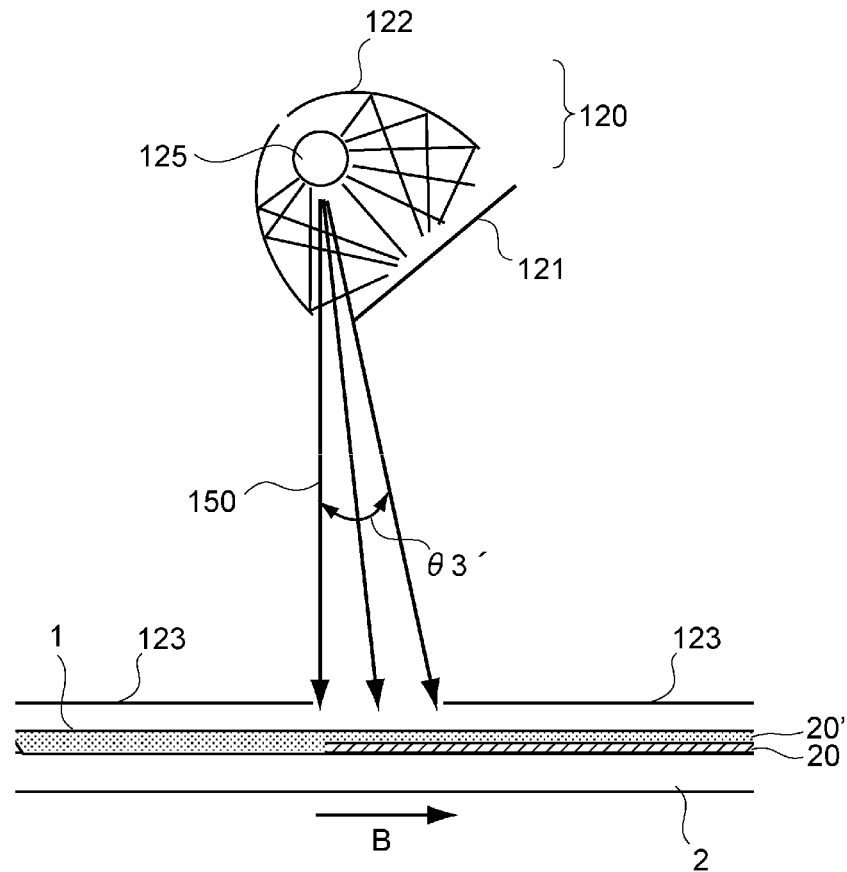
FIGS. 9(a) and 9(b) are other diagrams provided to illustrate first and second active energy ray irradiation processes.

More specifically, for example, as illustrated in FIG. 9(a), by disposing a heat ray cut-off filter 121 and a light blocking plate 123 in an ultraviolet irradiation apparatus 120 (for example, if a commercially available product is to be used, ECS-4011GX manufactured by Eye Graphics Co., Ltd.) in which a cold mirror 122 for light collection is provided on a linear ultraviolet lamp 125, active energy radiation 150 composed only of direct light and having a controlled irradiation angle is extracted and irradiated to the coating layer 1 formed on the process sheet 2.

Meanwhile, the linear ultraviolet lamp is installed, with respect to a direction perpendicular to the longitudinal direction of the process sheet 2 having the coating layer 1 as reference (0°), usually at an angle having a value in the range of −80° to 80°, preferably a value in the range of −50° to 50°, and particularly preferably a value in the range of −30° to 30°.

Here, the reason for using a linear light source is that a first louver structure region that is formed by arranging plate-shaped regions having different refractive indices alternately as well as in parallel at a constant inclination angle with respect to the film thickness direction, can be formed efficiently and stably.

More specifically, by using a linear light source, light that is substantially parallel when viewed from the axial direction of the linear light source, and is non-parallel when viewed from a direction perpendicular to the axial direction of the linear light source, can be irradiated.

Figure 9B:
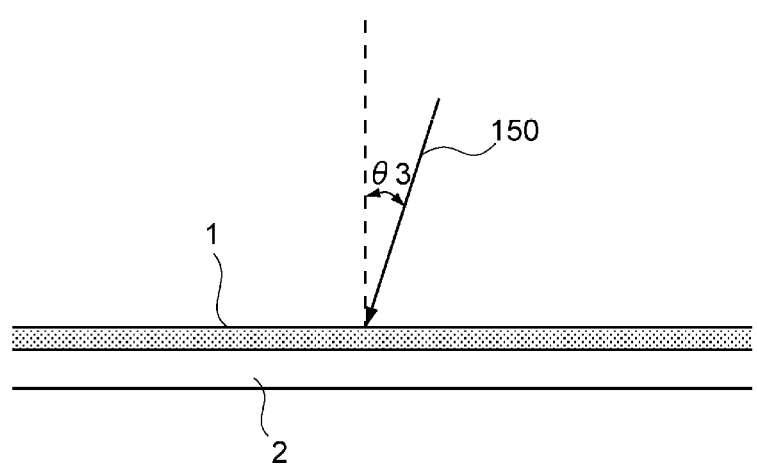

This time, regarding the irradiation angle of the irradiated light, as illustrated in FIG. 9(b), it is usually preferable to adjust the irradiation angle θ3 obtainable when the angle of the surface of the coating layer 1 with respect to the normal line is defined as 0°, to a value in the range of −80° to 80°.

The reason for this is that when the irradiation angle has a value that does not fall in the range of −80° to 80°, the influence of reflection or the like at the surface of the coating layer 1 becomes larger, and it may be difficult to form a sufficient louver structure.

Furthermore, the irradiation angle θ3 preferably has a width (irradiation angle width) θ3' of 1° to 80°.

The reason for this is that if such an irradiation angle width θ3' has a value of below 1°, the spacing of the louver structure becomes too narrow, and it may be difficult to obtain a desired first louver structure region. On the other hand, it is because if such an irradiation angle width θ3' has a value of above 80°, the irradiated light is dispersed excessively, and it may be difficult to form a louver structure.

Therefore, it is more preferable to adjust the irradiation angle width θ3' of the irradiation angle θ3 to a value in the range of 2° to 45°, and even more preferably to a value in the range of 5° to 20°.

Furthermore, examples of the light to be irradiated include ultraviolet radiation and an electron beam, but it is preferable to use ultraviolet radiation.

The reason for this is that in the case of an electron beam, since the rate of polymerization is very fast, the monomeric component (A) and the monomeric component (B) may not undergo phase separation sufficiently during the course of polymerization, and it may be difficult to form a louver structure. On the other hand, it is because when compared with visible light or the like, ultraviolet radiation can extend the range of selection of the monomeric component (A) and the monomeric component (B), since there is a rich variety of the ultraviolet-curable resin that is cured by irradiation of ultraviolet radiation, or of the photopolymerization initiator that can be used.

Furthermore, regarding the conditions for irradiation of ultraviolet radiation, it is preferable to adjust the illuminance at the surface of the coating layer to a value in the range of 0.1 mW/cm$^2$ to 3 mW/cm$^2$.

The reason for this is that if the illuminance has a value of below 0.1 mW/cm$^2$, a louver structure-unformed region can be sufficiently formed, but time is required to form the first louver structure region.

On the other hand, it is because if the illuminance has a value of above 3 mW/cm$^2$, the proportion of the first louver structure relative to the total film thickness of the film becomes too large, and it may be difficult to form the second louver structure region sufficiently to an extent that the light diffusion characteristics can be exhibited. Furthermore, it is because it is difficult for an overlapping louver structure region to be formed.

Therefore, it is more preferable to adjust the illuminance of ultraviolet radiation at the surface of the coating layer to a value in the range of 0.3 mW/cm$^2$ to 2 mW/cm$^2$, and even more preferably to a value in the range of 0.5 mW/cm$^2$ to 1.5 mW/cm$^2$.

Meanwhile, the illuminance as used herein means the measurement value at an area where the active energy radiation irradiated to the surface of the coating layer exhibits the maximum value.

Furthermore, it is preferable to adjust the amount of light at the surface of the coating layer to a value in the range of 10 mJ/cm$^2$ to 100 mJ/cm$^2$.

The reason for this is that if the amount of light has a value of below 10 mJ/cm$^2$, the first louver structure region may not be formed.

On the other hand, if the amount of light has a value of above 100 mJ/cm$^2$, the proportion of the first louver structure region becomes too large, so that the layer thickness of the louver structure-unformed region for forming the second louver structure region may be insufficient, or even if the louver structure-unformed region is sufficiently secured, the curing reaction at the louver structure-unformed region proceeds excessively, so that the second louver structure region may not be sufficiently formed in the second active energy ray irradiation step that will be described below.

Therefore, it is more preferable to adjust the amount of ultraviolet radiation at the surface of the coating layer to a value in the range of 10 mJ/cm$^2$ to 50 mJ/cm$^2$, and even more preferably to a value in the range of 10 mJ/cm$^2$ to 30 mJ/cm$^2$.

Meanwhile, the first active energy ray irradiation step is preferably carried out in an air atmosphere, from the viewpoint of leaving a louver structure-unformed region efficiently.

Furthermore, it is preferable to move the coating layer formed on a process sheet at a speed of 0.1 m/min to 10 m/min to thereby pass the area to be irradiated with ultraviolet radiation by an ultraviolet radiation apparatus.

The reason for this is that if such a rate has a value of below 0.1 m/min, mass productivity may be decreased excessively. On the other hand, it is because if such a rate has a value of above 10 m/min, the moving may occur faster than curing of the coating layer, in other words, faster than the formation of a louver structure, and the incident angle of ultraviolet radiation to the coating layer may be changed, so that formation of a louver structure may proceed insufficiently.

Therefore, it is more preferable to pass the area to be irradiated with ultraviolet radiation by an ultraviolet irradiation apparatus by moving the coating layer formed on a process sheet at a rate in the range of 0.2 m/min to 5 m/min, and more preferably at a rate in the range of 0.5 m/min to 3 m/min.

(4) Step (d): Second Active Energy Ray Irradiation Step

Step (d) is a step of further subjecting the coating layer to second active energy ray irradiation, and forming, in the louver structure-unformed region, a second louver structure region in which plural plate-shaped regions having different refractive indices are alternately arranged in parallel along any one direction along the film plane.

That is, the coating layer formed on a process sheet is irradiated with active energy radiation composed only of direct light and having a controlled irradiation angle.

Such second active energy ray irradiation step can be carried out basically similarly to the first active energy ray irradiation step.

Furthermore, regarding the irradiation conditions in the case of using ultraviolet radiation as the active energy radiation, it is preferable to adjust the illuminance at the surface of the coating layer to a value in the range of 0.1 mW/cm$^2$ to 20 mW/cm$^2$.

The reason for this is that if the illuminance has a value of below 0.1 mW/cm$^2$, it may be difficult to form the second louver structure region sufficiently.

On the other hand, it is because if the illuminance has a value of above 20 mW/cm$^2$, curing occurs before phase separation of the high refractive index component and the low refractive index component occurs in the louver structure-unformed region, and thus a louver structure may not be formed.

Therefore, it is more preferable to adjust the illuminance of ultraviolet radiation at the surface of the coating layer to a value in the range of 0.3 mW/cm$^2$ to 10 mW/cm$^2$, and even more preferable to a value in the range of 0.5 mW/cm$^2$ to 5 mW/cm$^2$.

Furthermore, it is preferable to adjust the amount of light at the surface of the coating layer to a value in the range of 5 mJ/cm$^2$ to 300 mJ/cm$^2$.

The reason for this is that if the amount of light has a value of below 5 mJ/cm$^2$, it may be difficult to form the second louver structure region sufficiently.

On the other hand, it is because if the amount of light has a value of above 300 mJ/cm$^2$, abnormality such as yellowing may occur in the anisotropic light diffusion film.

Therefore, it is more preferable to adjust the amount of ultraviolet radiation at the surface of the coating layer to a value in the range of 30 mJ/cm$^2$ to 200 mJ/cm$^2$, and even more preferable to a value in the range of 50 mJ/cm$^2$ to 150 mJ/cm$^2$.

Furthermore, the second active energy ray irradiation step is particularly preferably carried out in a non-oxygen atmosphere, by laminating a release film at the exposed surface of the coating layer, or by performing nitrogen purge, from the viewpoint of forming the second louver structure region efficiently.

That is, it is preferable to laminate a release film at the exposed surface of the coating layer, and to irradiate over the release film. As for the release film, a film having ultraviolet transmissibility among those described above as process sheets can be appropriately selected.

Furthermore, regarding the release film, the center line average roughness of the surface on the side that is not brought into contact with the coating layer preferably has a value of 2 µm or less, more preferably a value of below 1 µm, and particularly preferably a value of below 0.05 µm.

The reason for this is that with such a center line average roughness, the second active energy radiation is effectively prevented from being diffused by the release film, and the second louver structure region can be formed efficiently.

Meanwhile, the center line average roughness can be determined according to JIS B0633.

From the same viewpoint, the haze value of the release film preferably has a value in the range of 0% to 8%, and particularly preferably a value in the range of 0.1% to 5%.

Meanwhile, the haze value can be determined according to JIS K7136.

Furthermore, the image clarity (slit width: sum of the values for 0.125 mm, 0.25 mm, 0.5 mm, 1 mm and 2 mm) of the release film preferably has a value in the range of 200 to 500, and particularly preferably a value in the range of 300 to 490.

The reason for this is that if the image clarity has a value in such a range, the active energy radiation can be transmitted to the coating layer without being lost at the film, and the second louver structure region can be formed efficiently.

Meanwhile, the image clarity can be determined according to JIS K7374.

Furthermore, from the same viewpoint, it is more preferable that the transmittance of the release film to light having a wavelength of 360 nm have a value in the range of 30% to 100%, even more preferably a value in the range of 45% to 95%, and particularly preferably 75% to 90%.

Meanwhile, it is also preferable the further irradiate active energy radiation, separately from the first and second active energy ray irradiation, so that a cumulative amount of light with which the coating layer is sufficiently cured is achieved.

Since the active energy radiation at this time is intended to sufficiently cure the coating layer, it is preferable to use, not light that is parallel, but light that is random in any direction of travel between the longitudinal direction and the width direction of the film.

Furthermore, the light diffusion film after the photocuring step finally attains a usable state when the process sheet is detached.

EXAMPLES

Hereinafter, the anisotropic light diffusion film of the present invention will be described in more detail by way of Examples.

Example 1

1. Synthesis of Monomeric Component (B)

In a container, 2 moles of isophorone diisocyanate (IPDI) as a component (a) and 2 moles of 2-hydroxyethyl methacrylate (HEMA) as a component (c) were introduced with respect to 1 mole of polypropylene glycol (PPG) having a weight average molecular weight of 9,200 as a component (b), and then the compounds were condensed according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:

GPC analyzer: manufactured by Tosoh Corp., HLC-8020
GPC column: manufactured by Tosoh Corp. (hereinafter, described in order of passage)

TSK GUARD COLUMN HXL-H
TSK GEL GMHXL (x2)
TSK GEL G2000HXL

Measurement solvent: Tetrahydrofuran
Measurement temperature: 40° C.

2. Preparation of Composition for Anisotropic Light Diffusion Film

Subsequently, 100 parts by weight of o-phenylphenoxy-ethoxyethyl acrylate (manufactured by Shin Nakamura Chemical Co., Ltd., NK ESTER A-LEN-10) having a weight average molecular weight of 268 and represented by the following formula (3) as a monomeric component (A), and 5 parts by weight of 2-hydroxy-2-methylpropiophenone as a component (C) were added to 100 parts by weight of the polyether urethane methacrylate having a weight average molecular weight of 9,900 as the monomeric component (B) thus obtained, and then the compounds were heated and mixed under the conditions of 80° C. Thus, a composition for anisotropic light diffusion film was obtained.

Meanwhile, the refractive indices of the monomeric component (A) and the monomeric component (B) were measured using an Abbe refractometer [manufactured by Atago Co., Ltd., product name: "ABBE REFRACTOMETER DR-M2", Na light source, wavelength: 589 nm], according to JIS K0062, and the refractive indices were 1.58 and 1.46, respectively.

[Chemical Formula 6]

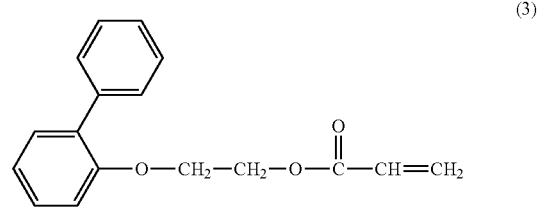

(3)

3. Application of Composition for Anisotropic Light Diffusion Film

Next, the composition for anisotropic light diffusion film thus obtained was applied on a transparent polyethylene terephthalate film (hereinafter, referred to as PET) as a process sheet using an applicator, and thus a coating layer having a film thickness of 200 µm was obtained.

4. Photocuring of Coating Layer (1) First Ultraviolet Irradiation

Next, an ultraviolet irradiation apparatus (manufactured by Eye Graphics Co., Ltd., ECS-4011GX) in which a cold mirror for light concentration is attached to a linear high pressure mercury lamp as illustrated in FIG. 9(a), was prepared.

Subsequently, a light blocking plate was installed on a heat ray cutoff filter frame, and the system was set up such that regarding the ultraviolet radiation irradiated to the surface of the coating layer, when the normal line direction of a laminate formed from the coating layer and PET when viewed from the longitudinal direction of the linear ultraviolet lamp was designated as 0°, the angle of direct irradiation of ultraviolet radiation from the lamp (θ3 in FIG. 9(b)) would be 30°.

At this time, the height of the lamp from the coating layer was set to 500 mm, and the peak illuminance was set to 1.0 mW/cm$^2$, while the cumulative amount of light was set to 50 mJ/cm$^2$.

Furthermore, in order to prevent the light reflected at the light blocking plate or the like, from becoming stray light within the irradiator and affecting the photocuring of the coating layer, a light blocking plate was also provided near the conveyor so that only the ultraviolet radiation emitted directly from the lamp would be irradiated to the coating layer.

Meanwhile, the illuminance and the amount of light described above were measured by installing a UV METER i-ultraviolet radiation integrating illuminometer "UVPF-A1" manufactured by Eye Graphics Co., Ltd., attached with a light receiver, at the position of the coating layer.

Subsequently, while the coating layer was moved by a conveyor at a speed of 0.2 m/min toward the right side as viewed in FIG. 9(a), ultraviolet radiation set up as described above was irradiated thereto.

(2) Second Ultraviolet Irradiation

Next, after the first ultraviolet irradiation step using a linear light source, an ultraviolet-transmissible release film (manufactured by Lintec Corp., SP-PET382050; center line average roughness at the surface on the side of ultraviolet irradiation: 0.01 μm, haze value: 1.80%, image clarity: 425, and transmittance at a wavelength of 360 nm: 84.3%) having a thickness of 38 μm was laminated on the exposed surface side of the coating layer.

Subsequently, the same ultraviolet irradiation apparatus as that used for the first ultraviolet irradiation was used, and the angle of direct irradiation of ultraviolet radiation from the lamp (θ3 in FIG. 9(b)) was set to be 16°. At this time, the height of the lamp from the coating layer was set to 500 mm, and the peak illuminance at the coating layer surface was set to 3.0 mW/cm$^2$, while the cumulative amount of light was set to 80 mJ/cm$^2$.

Subsequently, while the coating layer was moved by a conveyor at a speed of 0.2 m/min toward the right side as viewed in FIG. 9(a), ultraviolet radiation set up as described above was irradiated. Thus, an anisotropic light diffusion film having a total film thickness of 200 μm was obtained.

Meanwhile, the film thickness of the anisotropic light diffusion film was measured using a constant pressure thickness meter (manufactured by Takara Co., Ltd., TECLOCK PG-02J).

Figure 10:
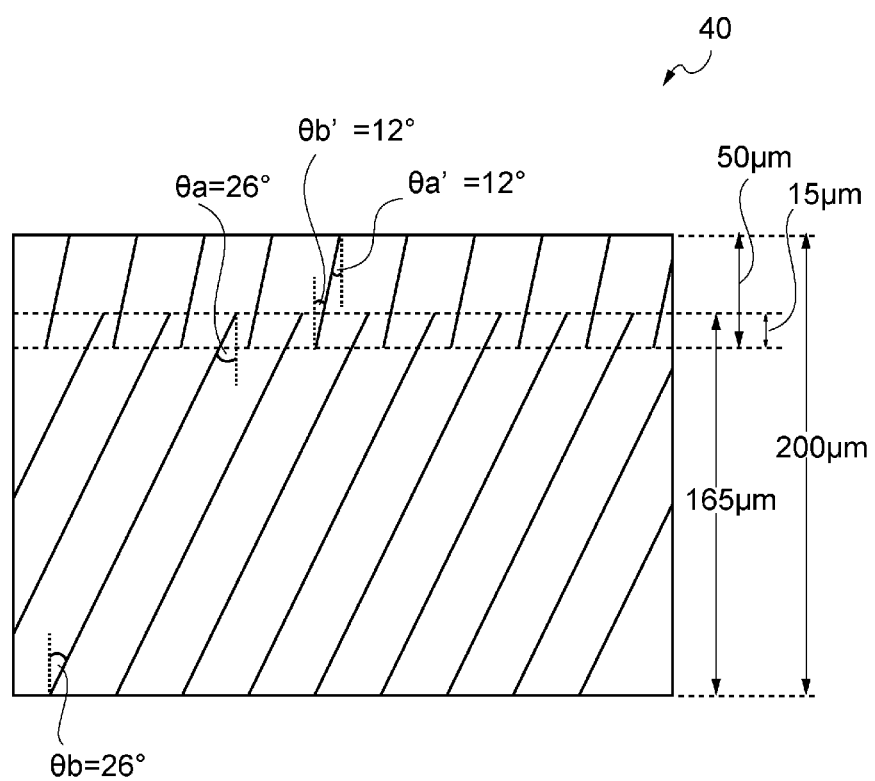
FIG. 10 is a diagram illustrating the configuration of the anisotropic light diffusion film of Example 1.

Furthermore, in regard to the anisotropic light diffusion film thus obtained, as illustrated in FIG. 10, it was confirmed that the plate-shaped regions in the first louver structure region were linear in shape, with the inclination angle θa (=θb) being 26°, and the plate-shaped regions in the second louver structure region were also linear in shape, with the inclination angle θa' (=θb') being 12°.

Furthermore, the diagram shown in FIG. 10 is a schematic diagram illustrating a cross-section of the film when the film was cut at a plane perpendicular to the plate-shaped regions in the first louver structure region and the second louver structure region.

Furthermore, the thickness of the first louver structure region was 165 μm the thickness of the second louver structure region was 50 μm, and the thickness of the overlapping louver structure region as 15 μm.

5. Measurement

Figure 11A:
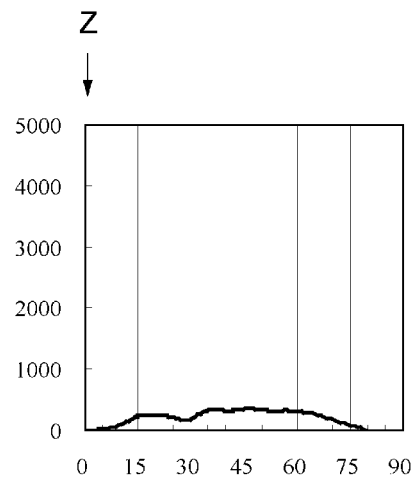
FIGS. 11(a) and 11(b) are a spectral diagram and a photograph illustrating the light diffusion characteristics of the anisotropic light diffusion film of Example 1.

Using a conoscope (manufactured by Autronic-Melchers GmbH), as illustrated in FIG. 11(a), light was allowed to enter to the anisotropic light diffusion film thus obtained, through the lower side of the film, that is, through the side where the first louver structure region was present, while changing the incident angle θ1 (°) to the relevant film. The incident angle at which incident light was diffused to the largest extent was determined as θ1=35°.

Figure 11B:
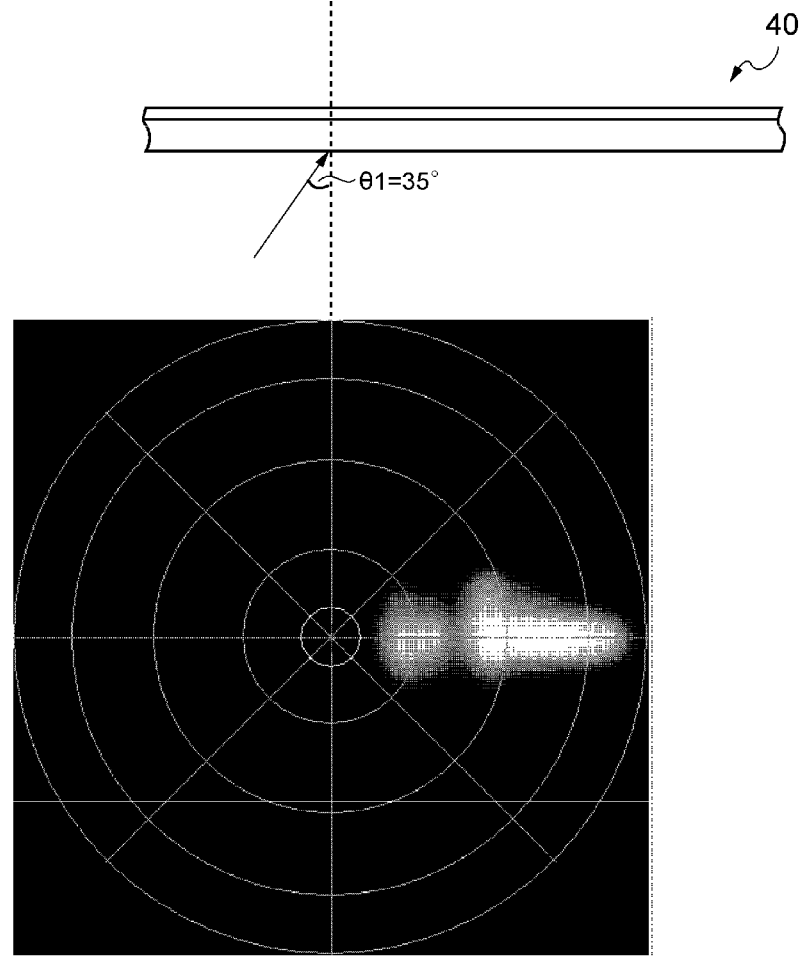

In this case, a spectral chart obtained by employing the diffusion angle (°) for the diffused light diffused by the anisotropic light diffusion film on the horizontal axis, and employing the intensity of diffused light (cd/m$^2$) on the vertical axis, is presented in FIG. 11(a), and a photograph of diffused light viewed from the Z-direction in FIG. 11(a) is presented in FIG. 11(b).

Furthermore, the light diffusion angle region (°) recognized from such a spectral chart is presented in Table 1.

Meanwhile, the light diffusion angle region is an angle region at which, when incident light is irradiated such that the illuminance at the anisotropic light diffusion film surface would be 65 Lux, the intensity of light diffused by the light diffusion film is 100 cd/m$^2$ or higher.

Furthermore, the maximum peak value (cd/m$^2$) for the intensity of diffused light in the light diffusion angle region is presented in Table 1.

Meanwhile, when such a maximum peak value has a value of 1,500 cd/m$^2$ or higher, it is considered that there is an area where incident light is not diffused but is transmitted directly in the light diffusion angle region, and this implies that the diffused light has poor uniformity.

Example 2

In Example 2, a light diffusion film was obtained in the same manner as in Example 1, except that the thickness of the coating layer was changed, and the irradiation angle θ3 for the second ultraviolet irradiation at the time of curing the coating layer was changed to 30°.

Figure 12:
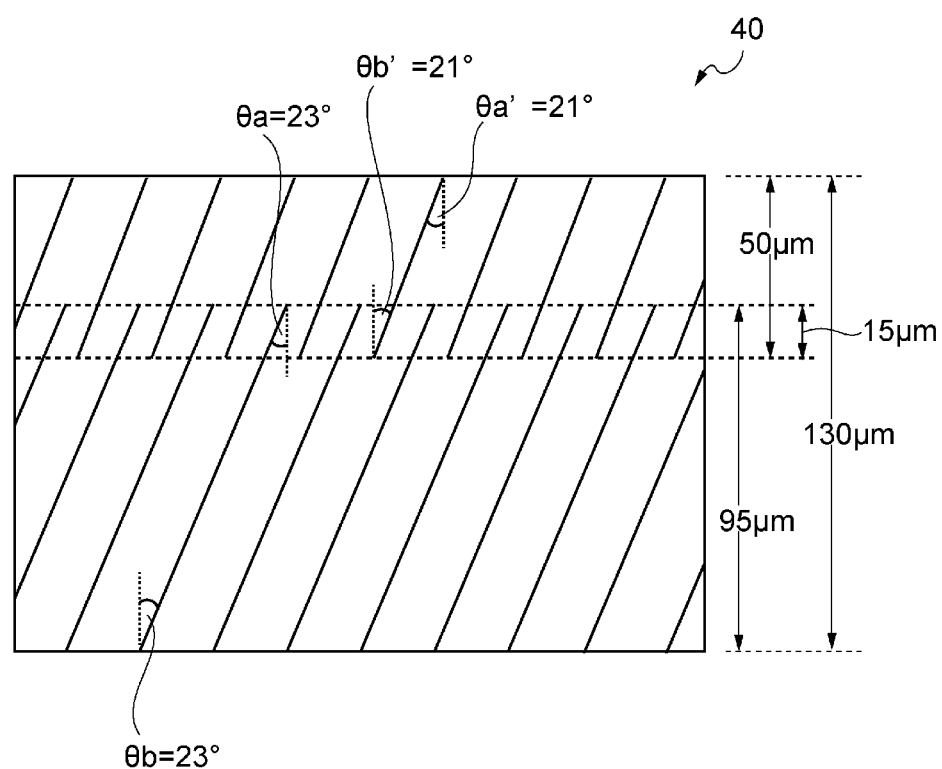
FIG. 12 is a diagram illustrating the configuration of the anisotropic light diffusion film of Example 2.

Furthermore, regarding the light diffusion film thus obtained, it was confirmed that, as illustrated in FIG. 12, the plate-shaped regions in the first louver structure region were linear in shape, with the inclination angle θa (=θb) being 23°, and the plate-shaped regions in the second louver structure region were linear in shape, with the inclination angle θa' (=θb') being 21°.

Furthermore, the diagram shown in FIG. 12 is a schematic diagram illustrating a cross-section of the film when the film was cut at a plane perpendicular to the plate-shaped regions in the first louver structure region and the second louver structure region.

Furthermore, the total film thickness was 130 μm, the thickness of the first louver structure region was 95 μm, the thickness of the second louver structure region was 50 μm, and the thickness of the overlapping louver structure region was 15 μm.

Figure 13A:
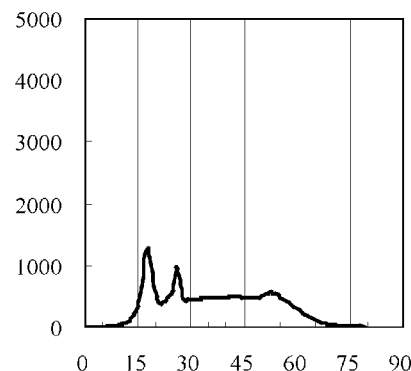
FIGS. 13(a) and 13(b) are a spectral diagram and a photograph illustrating the light diffusion characteristics of the anisotropic light diffusion film of Example 2.
Figure 13B:
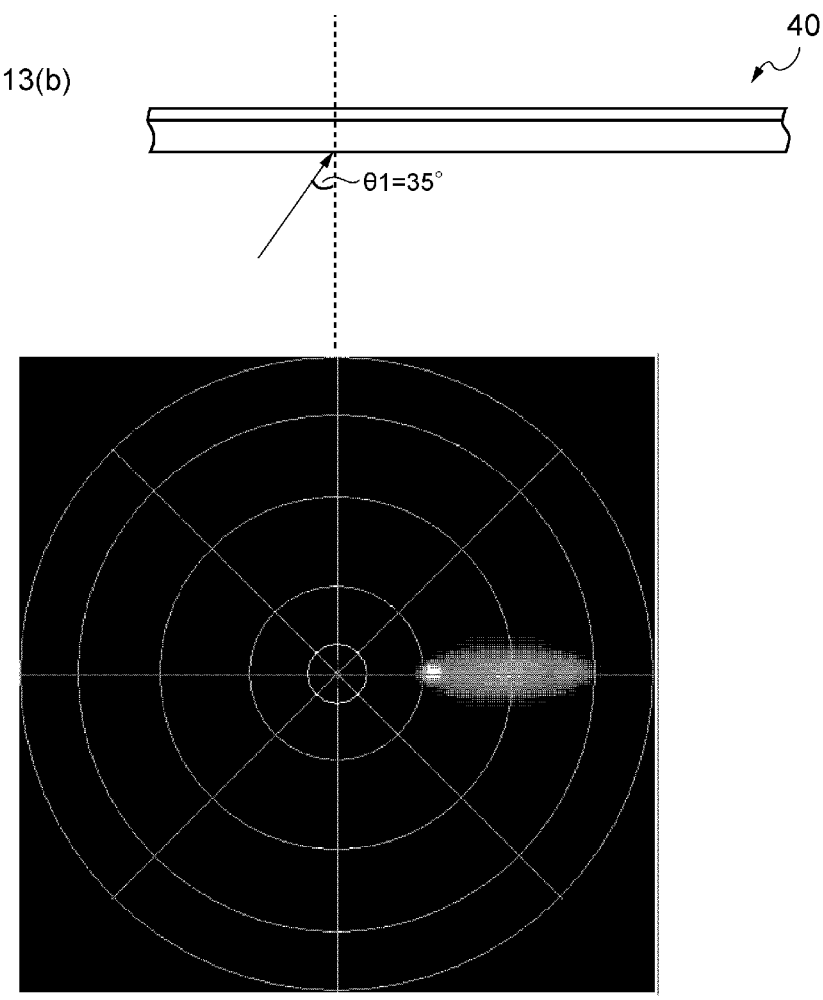

Furthermore, similar to Example 1, the intensity (cd/cm$^2$) of light diffused by the light diffusion film was measured using a conoscope, at the incident angle of incident light of θ1=35°. The spectral chart thus obtained is presented in FIG. 13(a), and a photograph of diffused light as viewed from the Z-direction in FIG. 13(a) is presented in FIG. 13(b).

Furthermore, the light diffusion angle region (°) and the maximum peak value (cd/cm$^2$) recognized from such a spectral chart are presented in Table 1.

Example 3

In Example 3, the thickness of the coating layer was changed, and at the same time, the irradiation angle θ3 for the first ultraviolet irradiation when the coating layer was cured was changed to 24.3°, while the illuminance was changed to 0.8 mW/cm$^2$, and the amount of light to 20 mJ/cm$^2$. Furthermore, the irradiation angle θ3 for the second ultraviolet irradiation was changed to 5°, and at the same time, the illuminance was changed to 1.4 mW/cm$^2$, and the amount of light to 40 mJ/cm$^2$.

Furthermore, a light diffusion film was obtained in the same manner as in Example 1, except that the speed of movement of the coating layer for the first and second ultraviolet irradiation was changed to 1.0 m/min.

Figure 14:
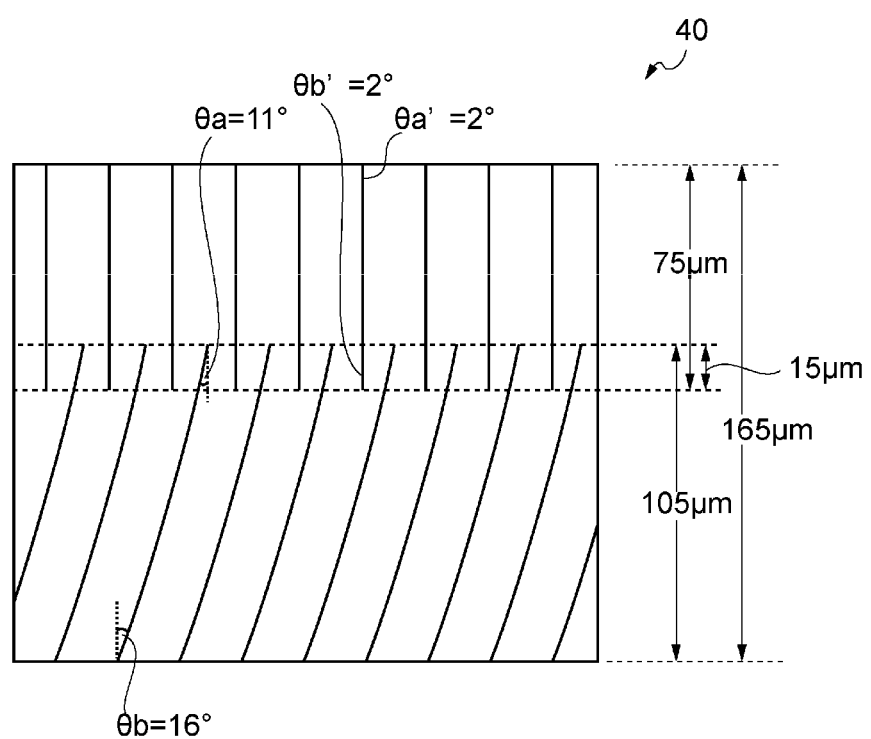
FIG. 14 is a diagram illustrating the configuration of the anisotropic light diffusion film of Example 3.

Also, regarding the light diffusion film thus obtained, as illustrated in FIG. 14, it was confirmed that the plate-shaped regions in the first louver structure region were bent in shape due to low illuminance, and the inclination angles were such that θa=11°, and θb=16°.

Furthermore, it was confirmed that the plate-shaped regions in the second louver structure region were linear in shape, and the inclination angle θa' (=θb') was 2°.

Furthermore, the diagram shown in FIG. 14 is a schematic diagram illustrating a cross-section of the film when the film was cut at a plane perpendicular to the plate-shaped regions in the first louver structure region and the second louver structure region.

Furthermore, the total film thickness was 165 μm, the thickness of the first louver structure region was 105 μm, the thickness of the second louver structure region was 75 μm, and the thickness of the overlapping louver structure region was 15 μm.

Figure 15A:
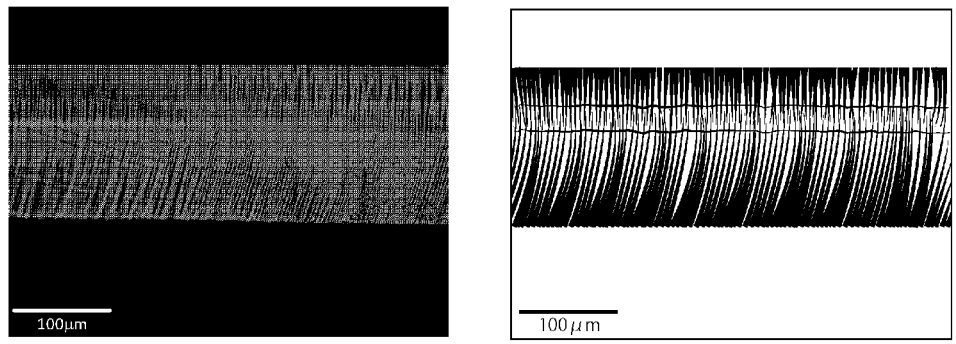
FIGS. 15(a) to 15(c) are photographs and diagrams illustrating the shapes of the cross-sections in the anisotropic light diffusion film of Example 3.
Figure 15B:
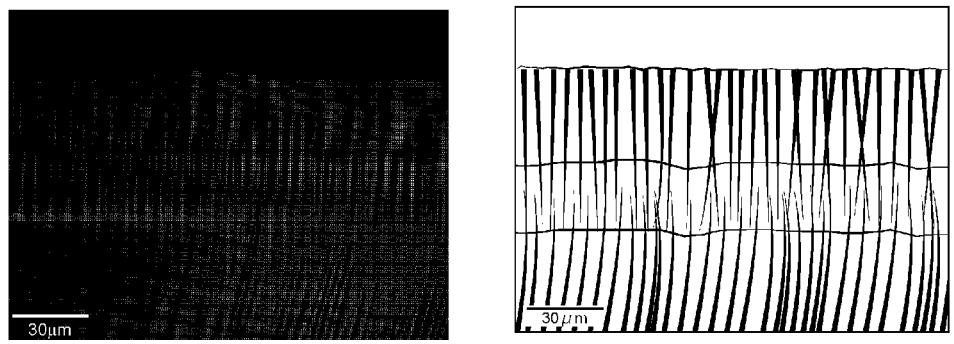
Figure 15C:
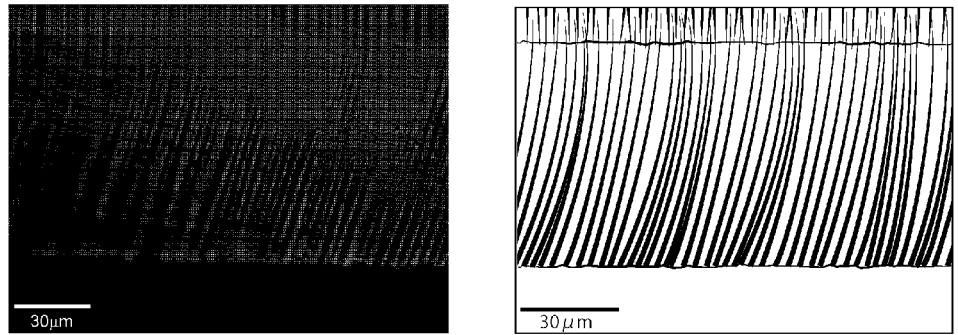

In addition, cross-sectional photographs of the light diffusion film thus obtained, and line diagrams generated from the cross-sectional photographs are presented in FIGS. 15(a) to 15(c).

Meanwhile, FIG. 15(a) presents a cross-sectional photograph and a line diagram showing the entire cross-section of the light diffusion film thus obtained; FIG. 15(b) presents a cross-sectional photograph and a line diagram showing the upper part of the film cross-section, that is, mainly the second louver structure region area; and FIG. 15(c) presents a cross-sectional photograph and a line diagram showing the lower art of the film cross-section, that is, mainly the first louver structure region area.

Figure 16A:
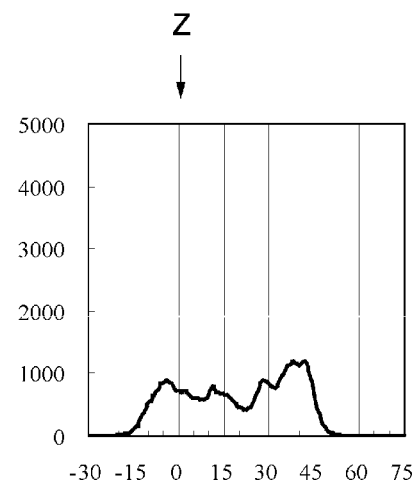
FIGS. 16(a) and 16(b) are a spectral diagram and a photograph illustrating the light diffusion characteristics of the anisotropic light diffusion film of Example 3.
Figure 16B:
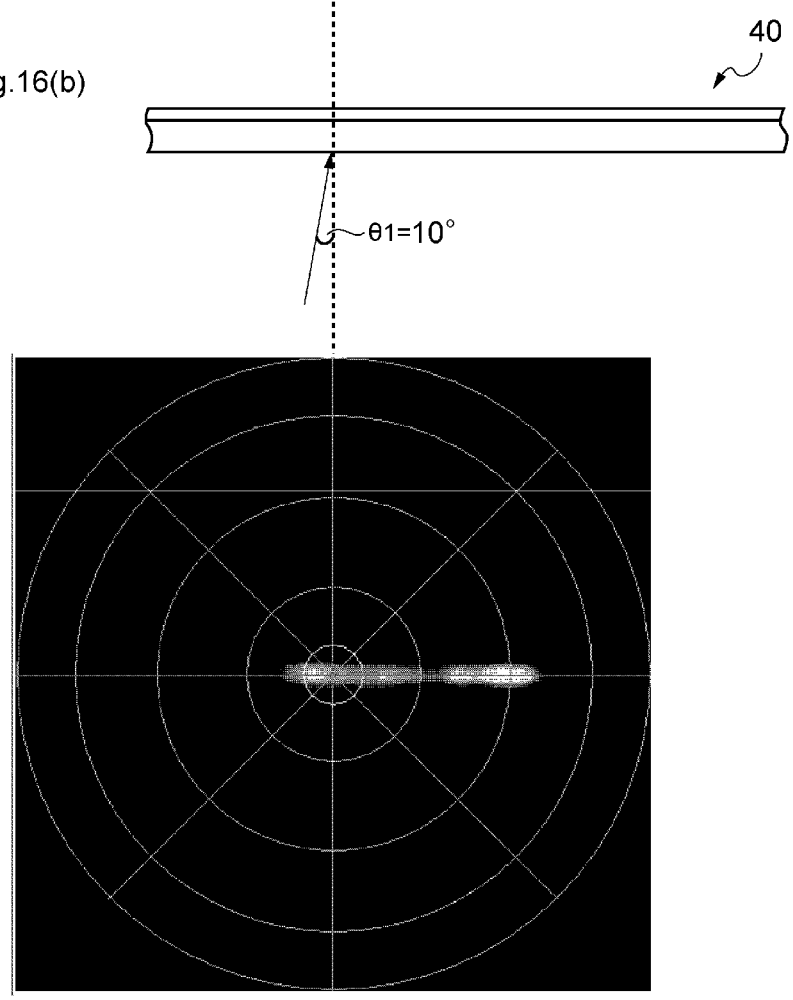

Furthermore, the intensity (cd/cm$^2$) of light diffused by the light diffusion was measured using a conoscope in the same manner as in Example 1, except that the incident angle of the incident light was set to θ1=10°. The spectral chart thus obtained is presented in FIG. 16(a), and a photograph of diffused light as viewed from the Z-direction in FIG. 16(a) is presented in FIG. 16(b).

Furthermore, the light diffusion angle region (°) and the maximum peak value (cd/cm$^2$) recognized from the spectral chart are presented in Table 1.

Comparative Example 1

In Comparative Example 1, an anisotropic light diffusion film was obtained in the same manner as in Example 1, except that when the coating layer was cured, the peak illuminance for the first ultraviolet irradiation was changed to 3.0 mW/cm$^2$.

Figure 17:
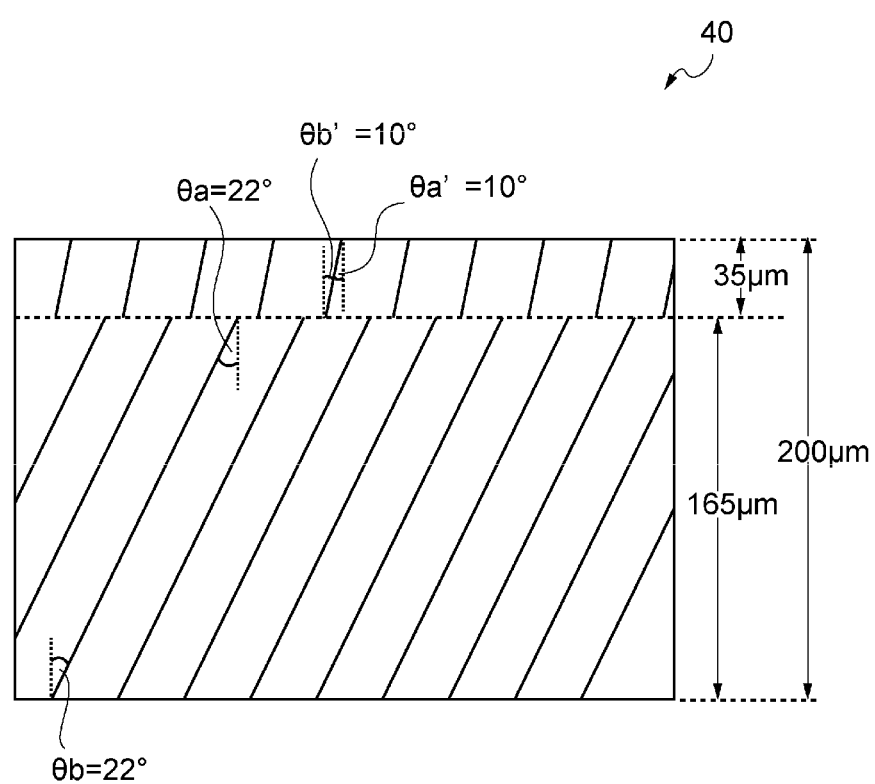
FIG. 17 is a diagram illustrating the configuration of the anisotropic light diffusion film of Comparative Example 1.

Furthermore, regarding the anisotropic light diffusion film thus obtained, as illustrated in FIG. 17, it was confirmed that the plate-shaped regions in the first louver structure region were linear in shape, with the inclination angle θa (=θb) being 22°, and the plate-shaped regions in the second louver structure region were linear in shape, with the inclination angle θa' (=θb') being 10°.

Meanwhile, the diagram shown in FIG. 17 is a schematic diagram illustrating a cross-section of the film when the film was cut at a plane perpendicular to the plate-shaped regions in the first louver structure region.

Furthermore, the total film thickness was 200 μm, the thickness of the first louver structure region was 165 μm, the thickness of the second louver structure was 35 μm, and there was no overlapping louver structure region.

Furthermore, similarly to Example 1, the intensity (cd/cm$^2$) of light diffused by the light diffusion film was measured using a conoscope at an incident angle of incident light of θ1=35°. The spectral chart thus obtained is presented in FIG. 18(a), and a photograph of diffused light as viewed from the Z-direction in FIG. 18(a) is presented in FIG. 18(b).

Also, the light diffusion angle region (°) and the maximum peak value (cd/cm$^2$) recognized from the spectral chart are presented in Table 1.

Comparative Example 2

In Comparative Example 2, a light diffusion film was obtained in the same manner as in Example 1, except that when the coating layer was cured, scattered light was irradiated for the second ultraviolet irradiation at an illuminance of 10 mW/cm$^2$ and an amount of light of 80 mJ/cm$^2$.

Figure 19:
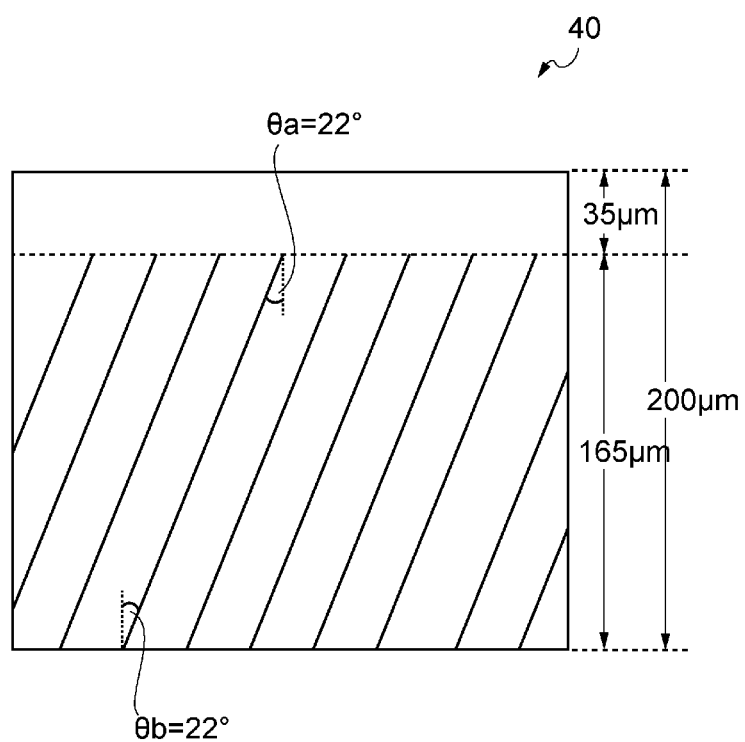
FIG. 19 is a diagram illustrating the configuration of the anisotropic light diffusion film of Comparative Example 2.

Furthermore, regarding the light diffusion film thus obtained, as illustrated in FIG. 19, it was confirmed that the plate-shaped regions in the first louver structure region were linear in shape, with the inclination angle θa (=θb) being 22°, and the second louver structure region was not formed.

Meanwhile, the diagram shown in FIG. 19 is a schematic diagram illustrating a cross-section of the film when the film was cut at a plane perpendicular to the plate-shaped region in the first louver structure region.

Furthermore, the total film thickness was 200 μm, the thickness of the first louver structure region was 165 μm, and the thickness of the part corresponding to the second louver structure region was 35 μm.

Figure 20A:
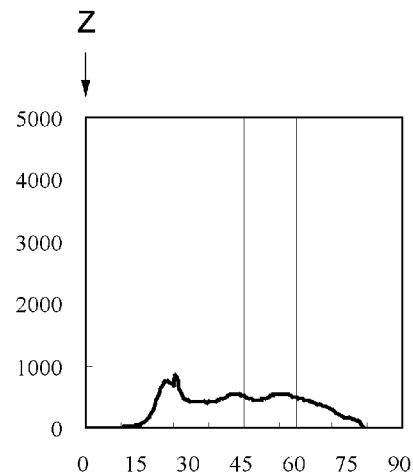
FIGS. 20(a) and 20(b) are a spectral diagram and a photograph illustrating the light diffusion characteristics of the anisotropic light diffusion film of Comparative Example 2.
Figure 20B:
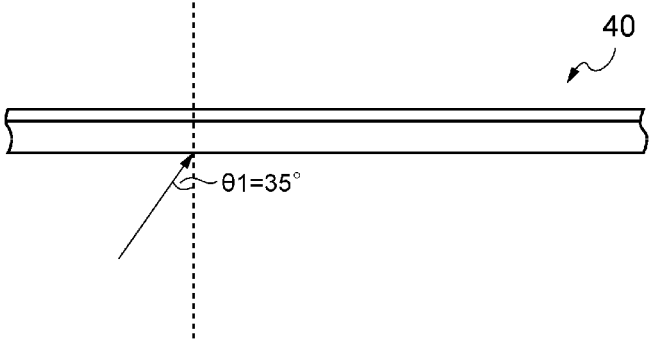
Figure 20B:
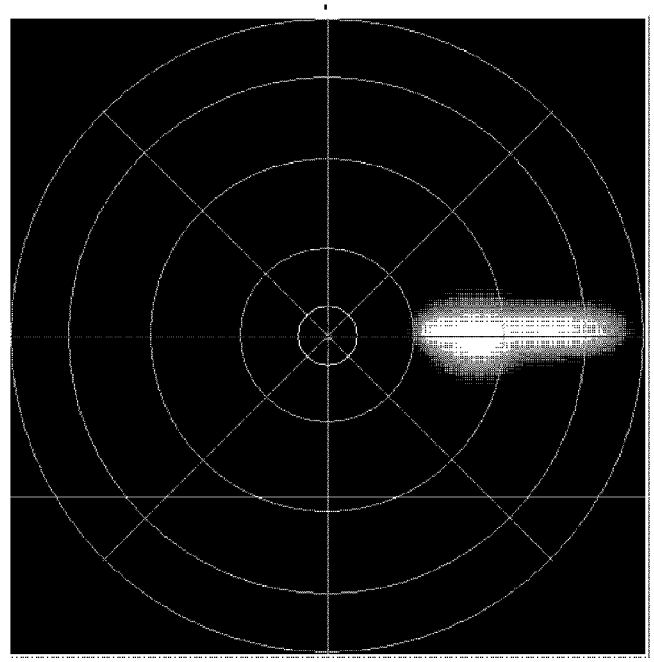

Furthermore, similar to Example 1, the intensity (cd/cm$^2$) of light diffused by the anisotropic light diffusion film was measured using a conoscope at an incident angle of incident light of θ1=35°. The spectral chart thus obtained is presented in FIG. 20(a), and a photograph of diffused light as viewed from the Z-direction in FIG. 20(a) is presented in FIG. 20(b).

Also, the light diffusion angle region (°) and the maximum peak value (cd/cm$^2$) recognized from the spectral chart are presented in Table 1.

Comparative Example 3

In Comparative Example 3, an anisotropic light diffusion film was obtained in the same manner as in Example 1, except that the thickness of the coating layer was changed, and also, when the coating layer was cured, scattered light was irradiated for the second ultraviolet irradiation at an illuminance of 10 mW/cm$^2$ and an amount of light of 80 mJ/cm$^2$.

Figure 21:
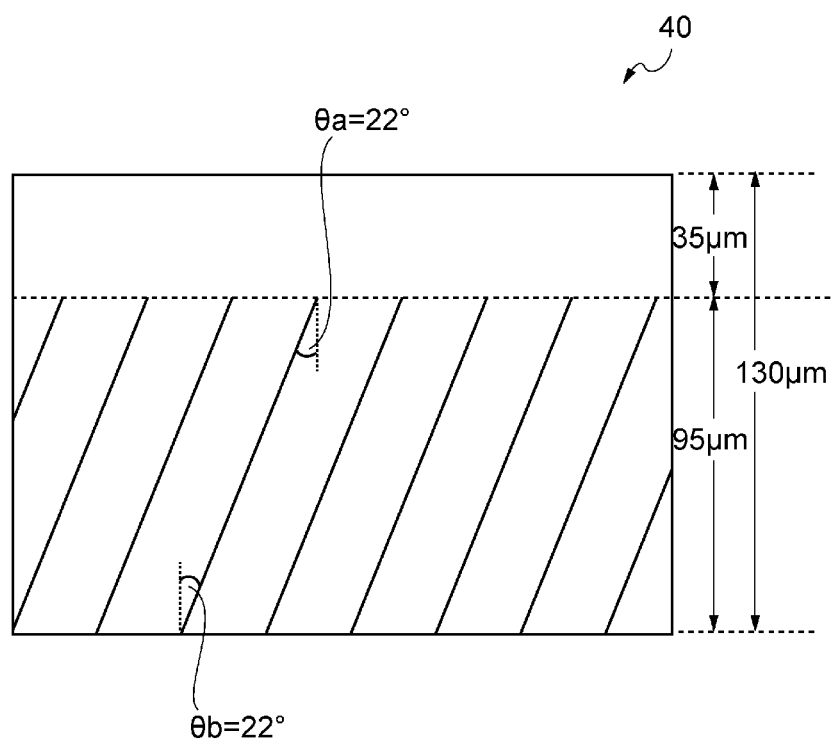
FIG. 21 is a diagram illustrating the configuration of the anisotropic light diffusion film of Comparative Example 3.

Furthermore, regarding the light diffusion film thus obtained, as illustrated in FIG. 21, it was confirmed that the plate-shaped regions in the first louver structure region were linear in shape, with the inclination angle θa (=θb) being 22°, and the second louver structure region was not formed.

Meanwhile, the diagram shown in FIG. 21 is a schematic diagram illustrating a cross-section of the film when the film was cut at a plane perpendicular to the plate-shaped region in the first louver structure region.

Furthermore, the total film thickness was 130 µm, the thickness of the first louver structure region was 95 µm, and the thickness of the part corresponding to the second louver structure region was 35 µm.

Figure 22A:
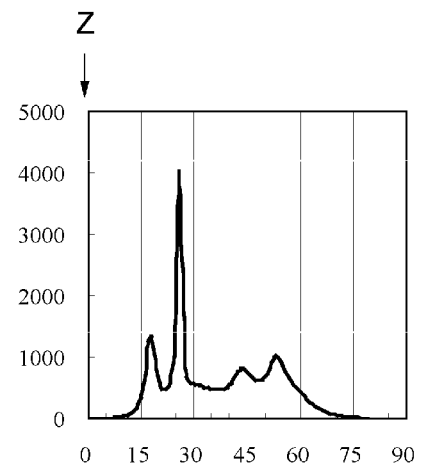
FIGS. 22(a) and 22(b) are a spectral diagram and a photograph illustrating the light diffusion characteristics of the anisotropic light diffusion film of Comparative Example 3.
Figure 22B:
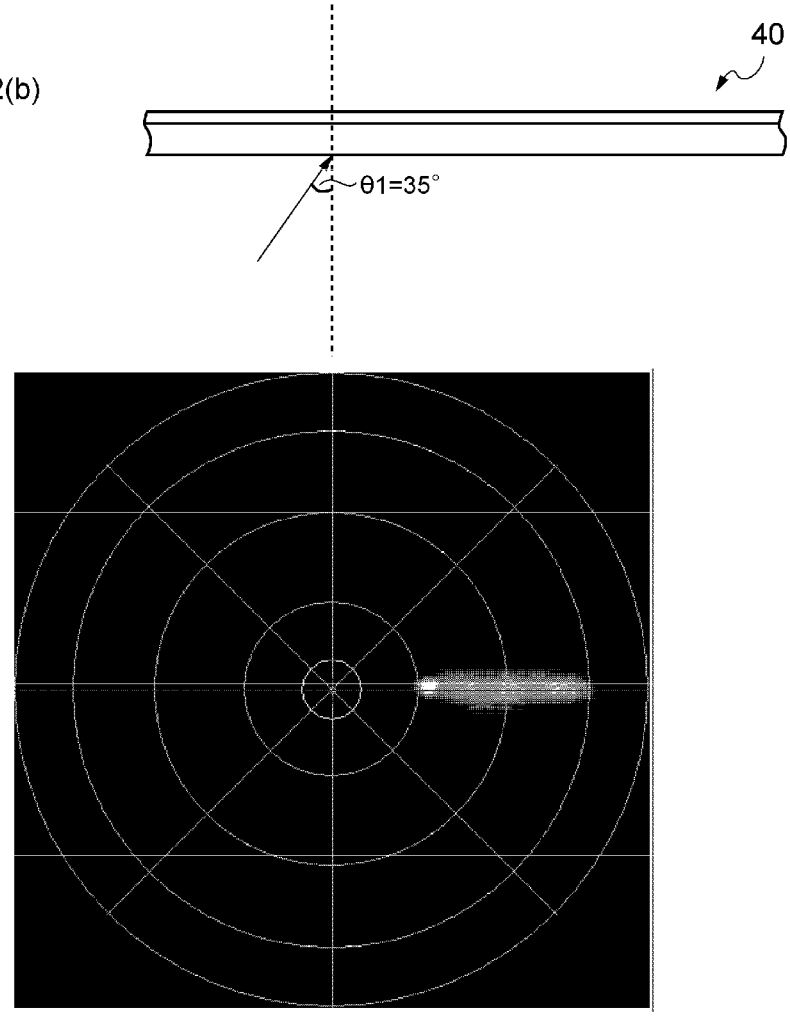

Furthermore, similar to Example 1, the intensity (cd/cm$^2$) of light diffused by the light diffusion film was measured using a conoscope at an incident angle of incident light of $\theta 1=35°$. The spectral chart thus obtained is presented in FIG. 22($a$), and a photograph of diffused light as viewed from the Z-direction in FIG. 22($a$) is presented in FIG. 22($b$).

Also, the light diffusion angle region (°) and the maximum peak value (cd/cm$^2$) recognized from the spectral chart are presented in Table 1.

Comparative Example 4

In Comparative Example 4, the thickness of the coating layer was changed. Also, when the coating layer was cured, the irradiation angle $\theta 3$ for the first ultraviolet irradiation was changed to 24.3°, and at the same time, the illuminance was changed to 0.8 mW/cm$^2$, and the amount of light to 20 mJ/cm$^2$; and scattered light was irradiated for the second ultraviolet irradiation at an illuminance of 10 mW/cm$^2$ and an amount of light of 40 mJ/cm$^2$.

Furthermore, an anisotropic light diffusion film was obtained in the same manner as in Example 1, except that the speed of movement of the coating layer for the first and second ultraviolet irradiation was changed to 1.0 m/min.

Figure 23:
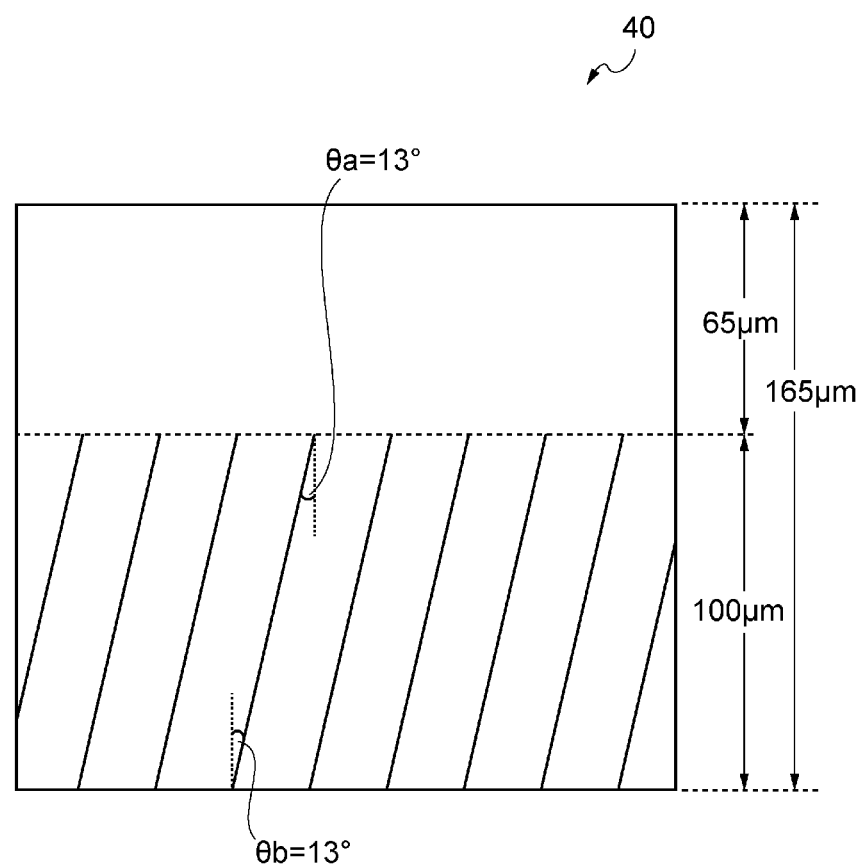
FIG. 23 is a diagram illustrating the configuration of the anisotropic light diffusion film of Comparative Example 4.
Figure 24A:
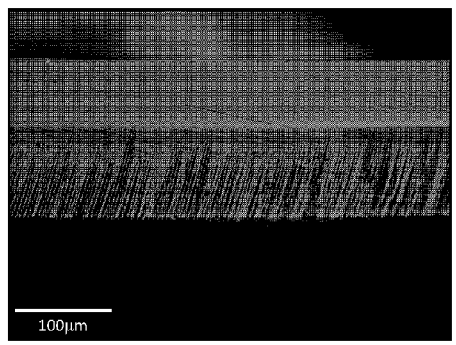
FIGS. 24(a) to 24(c) are photographs and diagrams illustrating the shapes of the cross-sections in the anisotropic light diffusion film of Comparative Example 4.
Figure 24A:
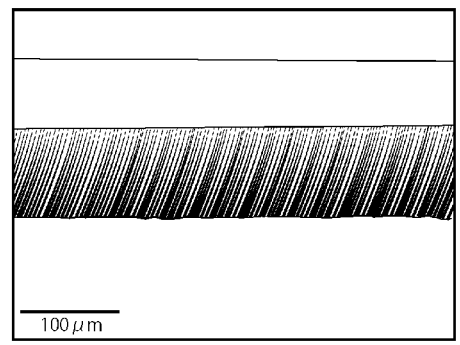
Figure 24B:
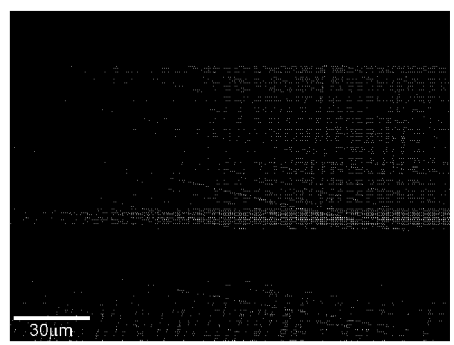
Figure 24B:
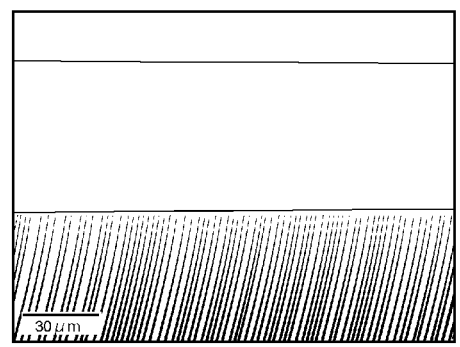
Figure 24C:
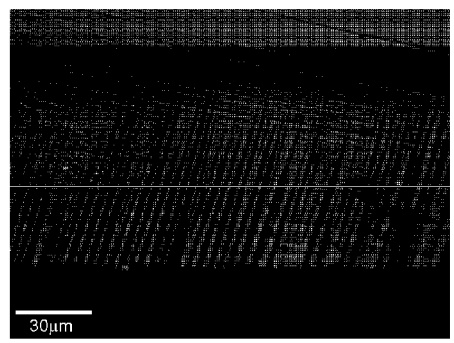
Figure 24C:
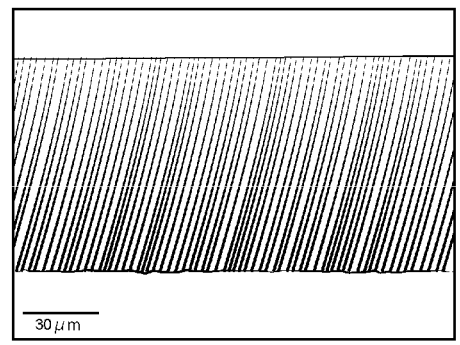

Also, regarding the anisotropic light diffusion film thus obtained, as illustrated in FIG. 23, it was confirmed that the plate-shaped regions in the first louver structure region were linear in shape, with the inclination angle $\theta a$ (=$\theta b$) being 13°, and the second louver structure region was not formed.

Meanwhile, the diagram shown in FIG. 23 is a schematic diagram illustrating a cross-section of the film when the film was cut at a plane perpendicular to the plate-shaped region in the first louver structure region.

Furthermore, the total film thickness was 165 µm, the thickness of the first louver structure region was 100 µm, and the thickness of the part corresponding to the second louver structure region was 65 µm.

In addition, cross-sectional photographs of the anisotropic light diffusion film thus obtained, and line diagrams generated from the cross-sectional photographs are presented in FIGS. 24($a$) to 24($c$).

Meanwhile, FIG. 24($a$) presents a cross-sectional photograph and a line diagram illustrating the entire cross-section of the anisotropic light diffusion film thus obtained; FIG. 24($b$) presents a cross-sectional photograph and a line diagram of the upper part of the film cross-section, that is, mainly the part corresponding to the second louver structure region; and FIG. 24($c$) presents a cross-sectional photograph and a line diagram of the lower part of the film cross-section, that is, mainly the first louver structure region area.

Figure 25A:
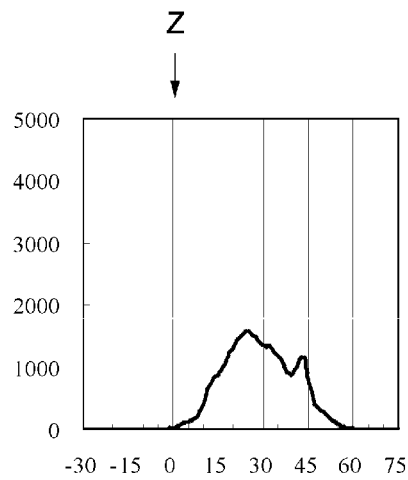
FIGS. 25(a) and 25(b) are a spectral diagram and a photograph illustrating the light diffusion characteristics of the anisotropic light diffusion film of Comparative Example 4.
Figure 25B:
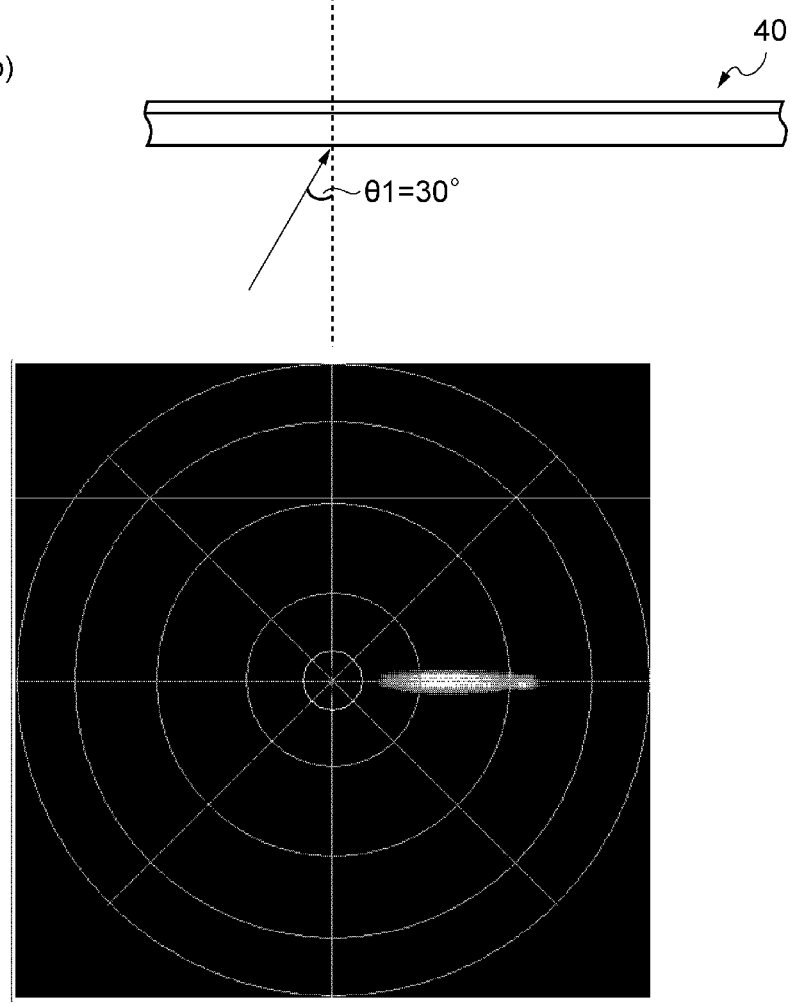
Figure 26A:
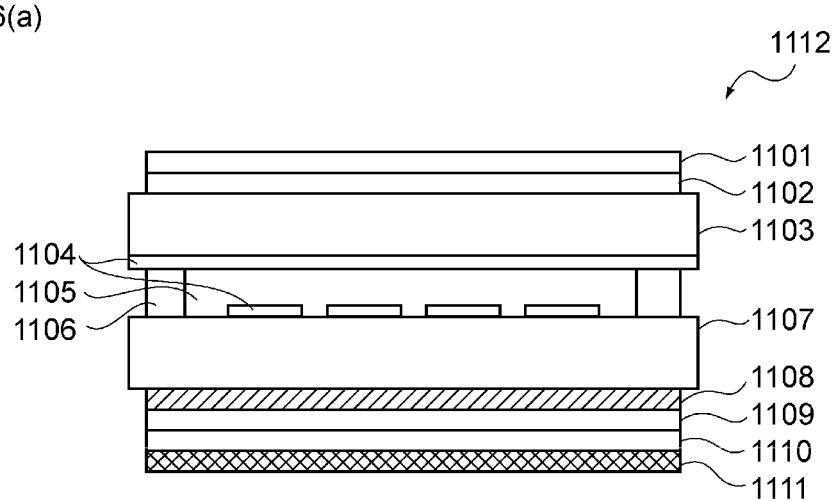
FIGS. 26(a) and 26(b) are diagrams provided to illustrate a reflective liquid crystal device using a conventional light diffusion film.
Figure 26B:
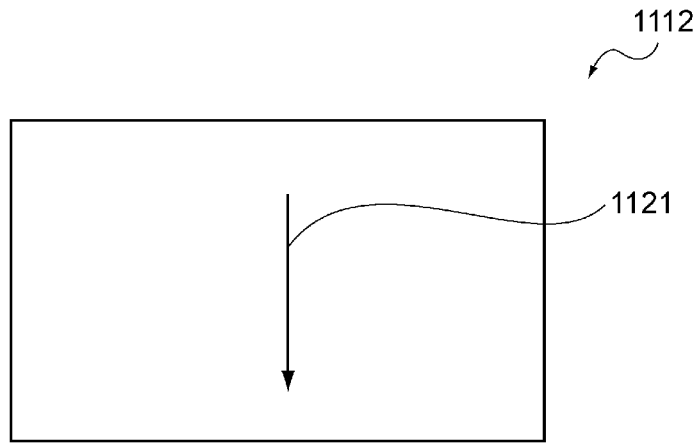

Furthermore, the intensity (cd/cm$^2$) of light diffused by the anisotropic light diffusion film was measured using a conoscope in the same meaner as in Example 1, except that the incident angle of incident light was set at $\theta 1=30°$. The spectral chart thus obtained is presented in FIG. 25($a$), and a photograph of diffused light as viewed from the Z-direction in FIG. 25($a$) is presented in FIG. 25($b$).

Furthermore, the light diffusion angle region (°) and the maximum peak value (cd/cm$^2$) recognized from the spectral chart are presented in Table 1.

TABLE 1

| | First ultraviolet irradiation | | | Second ultraviolet irradiation | | | Total film thickness (µm) | Light diffusion angle region | | |
|---|---|---|---|---|---|---|---|---|---|---|
| | Illuminance (mW/cm$^2$) | Amount of light (mJ/cm$^2$) | Irradiation angle $\theta 3$ (°) | Illuminance (mW/cm$^2$) | Amount of light (mJ/cm$^2$) | Irradiation angle $\theta 3$ (°) | | Angle region (°) | Angle of aperture (°) | Maximum peak value (cd/cm$^2$) |
| Example 1 | 1.0 | 50 | 30 | 3.0 | 80 | 16 | 200 | 10 to 73 | 63 | 400 |
| Example 2 | 1.0 | 50 | 30 | 3.0 | 80 | 30 | 130 | 12 to 65 | 53 | 1300 |
| Example 3 | 0.8 | 20 | 24.3 | 1.4 | 40 | 5 | 165 | −14 to 47 | 61 | 1200 |
| Comparative Example 1 | 3.0 | 50 | 30 | 3.0 | 80 | 16 | 200 | 19 to 71 | 52 | 500 |
| Comparative Example 2 | 1.0 | 50 | 30 | 10.0 | 80 | Scattered light | 200 | 17 to 78 | 61 | 500 |
| Comparative Example 3 | 1.0 | 50 | 30 | 10.0 | 80 | Scattered light | 130 | 13 to 67 | 54 | 4000 |
| Comparative Example 4 | 0.8 | 20 | 24.3 | 10.0 | 40 | Scattered light | 165 | 8 to 51 | 43 | 1600 |

Upon considering the results described above, it can be seen that when a comparison is made between Example 1 and Comparative Example 1, Example 1 having an overlapping louver structure region has a broadened width of the light diffusion angle region (angle of aperture of diffused light), compared to Comparative Example 1 that does not have the overlapping louver structure region.

Furthermore, it can be seen that when Example 1 is compared with Comparative Example 2, or Example 3 is compared with Comparative Example 4, an anisotropic light diffusion film having a second louver structure region and an overlapping louver structure region has a broadened width of the light diffusion angle region (angle of aperture of diffused light).

Furthermore, in Comparative Example 3, since the maximum peak value (cd/cm$^2$) in the intensity of diffused light in the light diffusion angle region exceeds 1,500 cd/cm$^2$, it is considered that the film thickness as an anisotropic light diffusion film is insufficient. However, in Example 2, it can be seen that with the same film thickness, the maximum peak value (cd/cm$^2$) is suppressed to a value of below 1,500 cd/cm$^2$.

INDUSTRIAL APPLICABILITY

As described above, according to the present invention, an anisotropic light diffusion film having increased uniformity of the intensity of diffused light in the light diffusion angle region and having an effectively expanded light diffusion angle region can be obtained, by forming a first louver structure region and a second louver structure region within a same film, and also providing an overlapping structure region in which these louver structure regions partly overlap each other.

Therefore, the anisotropic light diffusion film of the present invention can be applied to a light control film for a reflective liquid crystal device, as well as to a viewing angle control film, a viewing angle expansion film, and a screen for projection. Thus, it is expected that the anisotropic light diffusion film would contribute markedly to an enhancement of product quality of these films.

EXPLANATIONS OF LETTERS OR NUMERALS

1: COATING LAYER
2: PROCESS SHEET
10: CONVENTIONAL ANISOTROPIC LIGHT DIFFUSION FILM
12: PLATE-SHAPED REGIONS HAVING RELATIVELY HIGH REFRACTIVE INDEX
13: LOUVER STRUCTURE REGION
13': BOUNDARY SURFACE OF LOUVER STRUCTURE
14: PLATE-SHAPED REGIONS HAVING RELATIVELY LOW REFRACTIVE INDEX
20: FIRST LOUVER STRUCTURE REGION
20': LOUVER STRUCTURE-UNFORMED REGION
30: SECOND LOUVER STRUCTURE REGION
40: ANISOTROPIC LIGHT DIFFUSION FILM OF PRESENT INVENTION
50: OVERLAPPING LOUVER STRUCTURE REGION
100: REFLECTIVE LIQUID CRYSTAL DISPLAY DEVICE
101: POLARIZING PLATE
102: RETARDATION PLATE
103: LIGHT DIFFUSION PLATE
104: GLASS PLATE
105: COLOR FILTER
106: LIQUID CRYSTALS
107: MIRROR SURFACE REFLECTING PLATE
108: GLASS PLATE
110: LIQUID CRYSTAL CELL
120: ULTRAVIOLET IRRADIATION APPARATUS
121: HEAT RAY CUTOFF FILTER
122: COLD MIRROR
123: LIGHT BLOCKING PLATE
125: LINEAR ULTRAVIOLET RADIATION LAMP
150: ACTIVE ENERGY RADIATION

The invention claimed is:

1. An anisotropic light diffusion film comprising a first louver structure region and a second louver structure region sequentially from the lower side along the film thickness direction, wherein each of the first louver structure region and the second louver structure region comprise plural plate-shaped regions having different refractive indices alternately arranged in parallel along any one direction along the film plane,
wherein the anisotropic light diffusion film comprises an overlapping structure region in which the upper end of the first louver structure region extends into the lower end of the second louver structure region so that the upper end of the first louver structure region and the lower end of the second louver structure region overlap each other in a cross-section of the anisotropic light diffusion film when the anisotropic light diffusion film is cut at a plane perpendicular to the plate-shaped regions in the first louver structure region and the second louver structure region.

2. The anisotropic light diffusion film according to claim 1, wherein the overlapping structure region is formed such that the tips of any one side of the plate-shaped regions respectively originating from the first louver structure region and the second louver structure region are in contact with the vicinity of the tips of the plate-shaped regions originating from the other louver structure region.

3. The anisotropic light diffusion film according to claim 1, wherein the thickness of the overlapping structure region has a value in the range of 1 μm to 40 μm.

4. The anisotropic light diffusion film according to claim 1, wherein the thickness of the overlapping structure region has a value in the range of 0.1% to 10% relative to 100% of the film thickness.

5. The anisotropic light diffusion film according to claim 1, wherein in the overlapping structure region, the absolute value of the difference in the inclination angle of the plate-shaped regions having different refractive indices and respectively originating from the first louver structure region and the second louver structure region, is adjusted to a value of 1° or more.

6. The anisotropic light diffusion film according to claim 1, wherein in the overlapping structure region, the absolute value of the inclination angle of the plate-shaped regions originating from the second louver structure region is adjusted to be a value larger than the absolute value of the inclination angle of the plate-shaped regions originating from the first louver structure region.

7. The anisotropic light diffusion film according to claim 1, wherein the widths of the plate-shaped regions in the first louver structure region and the second louver structure region are respectively adjusted to a value in the range of 0.1 μm to 15 μm.

8. The anisotropic light diffusion film according to claim 1, wherein the plate-shaped regions in the first louver structure region are bent in the upper part or in the lower part along the film thickness direction.

9. The anisotropic light diffusion film according to claim 1, wherein among the plate-shaped regions in the first louver structure region and the second louver structure region, a main component of the plate-shaped regions having a higher refractive index is a (meth)acrylic acid ester polymer containing plural aromatic rings, and a main component of the plate-shape regions having a lower refractive index is a polymer of urethane (meth)acrylate.

10. The anisotropic light diffusion film according to claim 1, wherein the thickness of the first louver structure region is adjusted to a value in the range of 50 μm to 500 μm, and the thickness of the second louver structure region is adjusted to a value in the range of 10 μm to 200 μm.

11. The anisotropic light diffusion film according to claim 1, wherein the value obtained by subtracting the thickness of the overlapping structure region from the sum of the thicknesses of the first louver structure region and the second louver structure region, is adjusted to a value of 80% or more relative to 100% of the film thickness.

* * * * *